(12) United States Patent
Gill

(10) Patent No.: US 12,215,805 B2
(45) Date of Patent: Feb. 4, 2025

(54) SUBSEA LINE CLAMP ASSEMBLY

(71) Applicant: Balmoral Comtec Limited, Aberdeen (GB)

(72) Inventor: Aneel Gill, Monifieth Tayside (GB)

(73) Assignee: Balmoral Comtec Limited, Aberdeen (GB)

( * ) Notice: Subject to any disclaimer, the term of this patent is extended or adjusted under 35 U.S.C. 154(b) by 198 days.

(21) Appl. No.: 17/909,025

(22) PCT Filed: Mar. 2, 2021

(86) PCT No.: PCT/GB2021/050517
§ 371 (c)(1),
(2) Date: Sep. 2, 2022

(87) PCT Pub. No.: WO2021/176205
PCT Pub. Date: Sep. 10, 2021

(65) Prior Publication Data
US 2023/0110686 A1 Apr. 13, 2023

(30) Foreign Application Priority Data
Mar. 4, 2020 (GB) ...................................... 2003144

(51) Int. Cl.
*F16L 1/20* (2006.01)
*B63B 21/08* (2006.01)
(Continued)

(52) U.S. Cl.
CPC ................ *F16L 1/20* (2013.01); *B63B 21/08* (2013.01); *B63B 21/27* (2013.01); *E21B 17/015* (2013.01);
(Continued)

(58) Field of Classification Search
CPC ..... F16L 1/20; F16L 1/201; F16L 1/24; F16L 3/1066; B63B 21/08; E21B 43/01
(Continued)

(56) References Cited

U.S. PATENT DOCUMENTS 4,823,919 A 4/1989 Hayatdavoudi
7,241,075 B2 * 7/2007 Ottesen ................... E21B 43/01
405/172
(Continued)

FOREIGN PATENT DOCUMENTS

EP 2143873 A1 1/2010
EP 2163722 B1 10/2013
(Continued)

OTHER PUBLICATIONS

Examination Report from UKIPO dated Aug. 25, 2023 for Application No. GB2102907.9 (2 pages).
(Continued)

*Primary Examiner* — Frederick L Lagman
(74) *Attorney, Agent, or Firm* — Amundsen Davis LLC

(57) ABSTRACT

A subsea line clamp assembly (1) has a body (10) having an axis and a clamp member (50), assembled in segments around a subsea line (3), and tethered to a subsea anchor (5). The clamp member (50) is movably located within the body (10). The inner surface of the body (10) and the outer surface of the clamp member (50) have respective tapered portions as part of teeth (32, 72) arranged to inter-engage. Adjacent teeth (32, 72) may be separated by axis-parallel portions. The clamping force on the subsea line (30) can be maintained at a consistent clamping force throughout the service life of the subsea line (3), despite the actions of creep and compression acting to reduce the outer diameter of the line (3).

20 Claims, 13 Drawing Sheets

(51) Int. Cl.
  *B63B 21/27* (2006.01)
  *E21B 17/01* (2006.01)
  *E21B 17/02* (2006.01)
  *E21B 43/01* (2006.01)
  *F16L 1/24* (2006.01)
  *F16L 3/10* (2006.01)

(52) U.S. Cl.
  CPC ............ *E21B 17/017* (2013.01); *E21B 17/02* (2013.01); *E21B 43/01* (2013.01); *F16L 1/24* (2013.01); *F16L 3/1066* (2013.01)

(58) Field of Classification Search
  USPC .......................................................... 405/172
  See application file for complete search history.

(56) References Cited

U.S. PATENT DOCUMENTS

| | | | | |
|---|---|---|---|---|
| 7,942,608 | B2 * | 5/2011 | Bastard | F16L 1/201 405/172 |
| 8,123,437 | B2 * | 2/2012 | Wolbers | F16L 1/18 405/172 |
| 2004/0012198 | A1 | 1/2004 | Brotzell et al. | |
| 2004/0156684 | A1 | 8/2004 | Pionetti | |
| 2004/0163821 | A1 | 8/2004 | vanBilderbeek | |
| 2006/0204338 | A1 | 9/2006 | Ottesen et al. | |
| 2014/0061397 | A1 * | 3/2014 | Skarnes | B23K 37/0535 248/74.1 |
| 2017/0350196 | A1 | 12/2017 | Hoyvik | |
| 2018/0356003 | A1 * | 12/2018 | Lodeho | F16L 59/143 |
| 2023/0304605 | A1 * | 9/2023 | Arnold | F16L 1/24 |

FOREIGN PATENT DOCUMENTS

| | | | | |
|---|---|---|---|---|
| EP | 3483383 | A1 | 5/2019 | |
| EP | 3591274 | A1 | 1/2020 | |
| ES | 2744780 | T3 * | 2/2020 | .......... E21B 17/012 |
| GB | 2448257 | A | 10/2008 | |
| GB | 2476095 | A | 6/2011 | |
| GB | 2501489 | A | 10/2013 | |
| GB | 2591473 | A * | 8/2021 | .............. F16L 1/123 |
| KR | 20150000551 | U * | 2/2015 | |
| WO | 2004007896 | A2 | 1/2004 | |
| WO | 2005100738 | A2 | 10/2005 | |
| WO | 2015173572 | A2 | 11/2015 | |
| WO | 2016092522 | A1 | 6/2016 | |

OTHER PUBLICATIONS

Examination Report from UKIPO dated Nov. 1, 2023 for Application No. GB2102907.9 (2 pages).
GB2003144.9 Search Report from the Great Britain Intellectual Property Office dated Mar. 25, 2020 (3 pages).
PCT/GB2021/050517 International Search Report and Written Opinion of the International Searching Authority dated Apr. 19, 2021 (13 pages).
GB2102907.9 Search Report from the Great Britain Intellectual Property Office dated Sep. 1, 2021 (1 page).

* cited by examiner

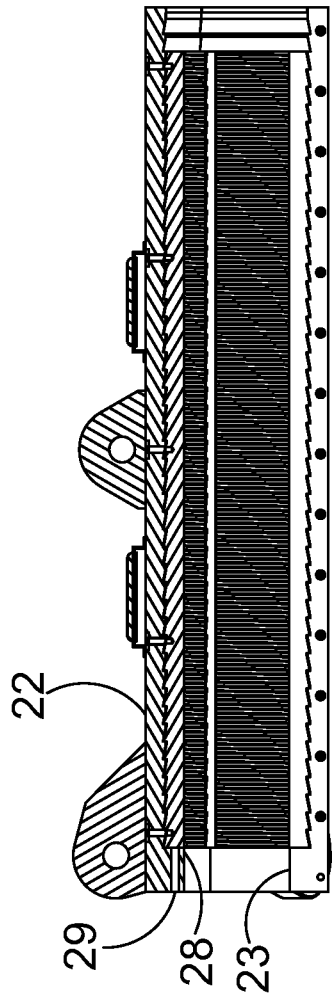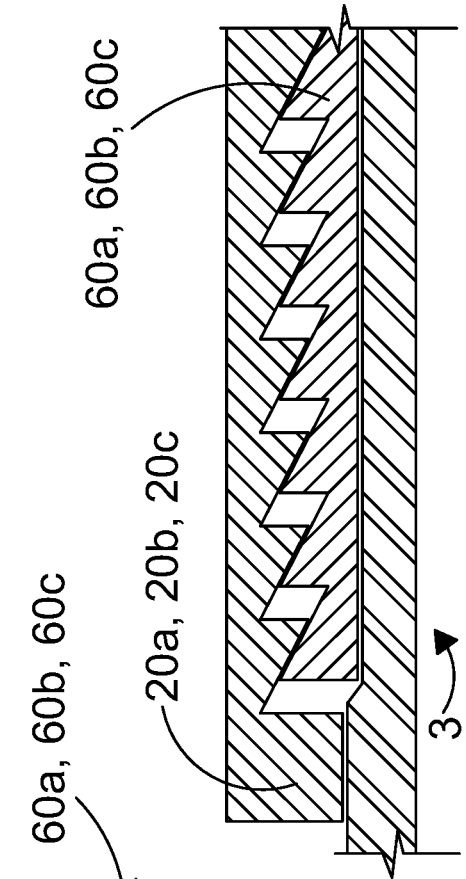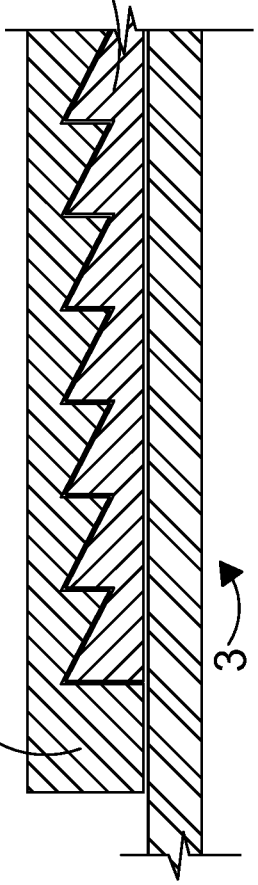

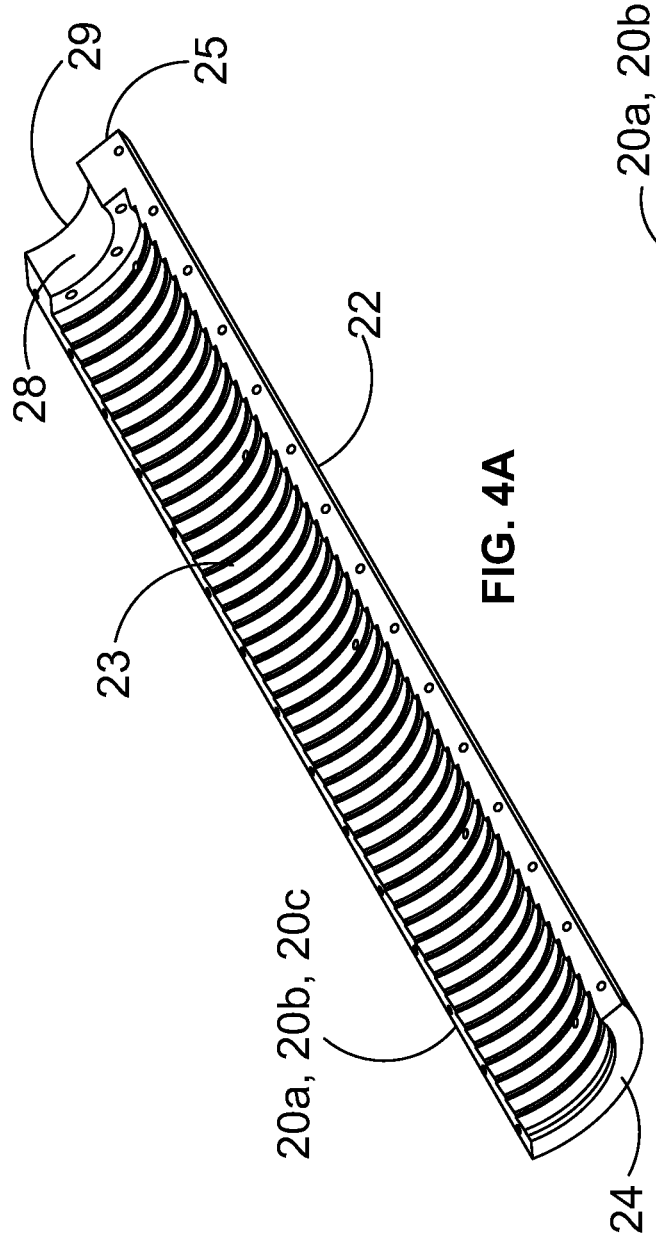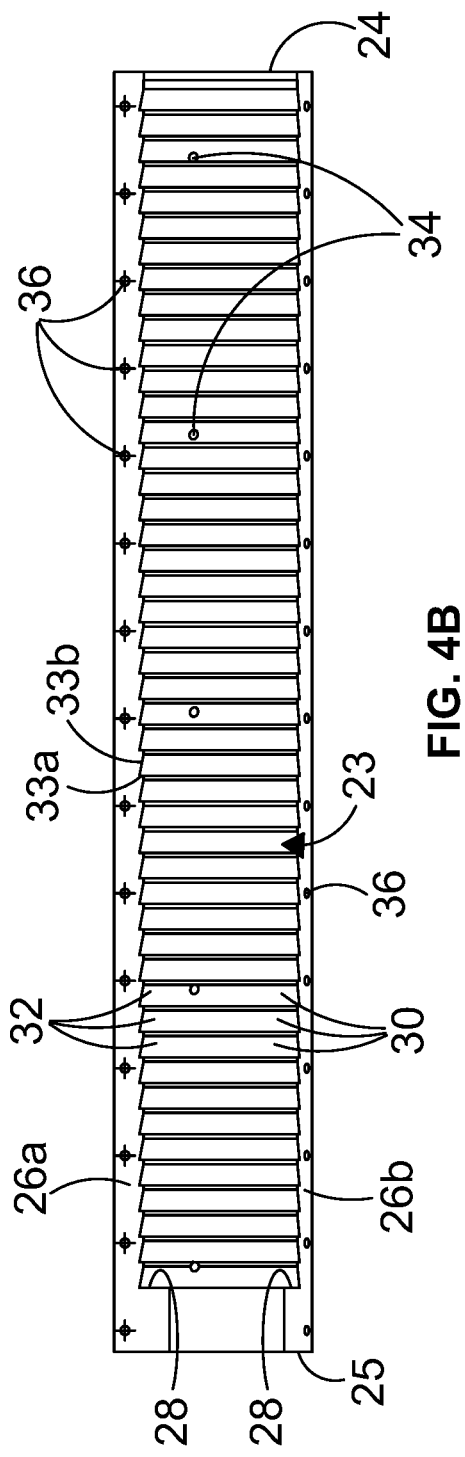

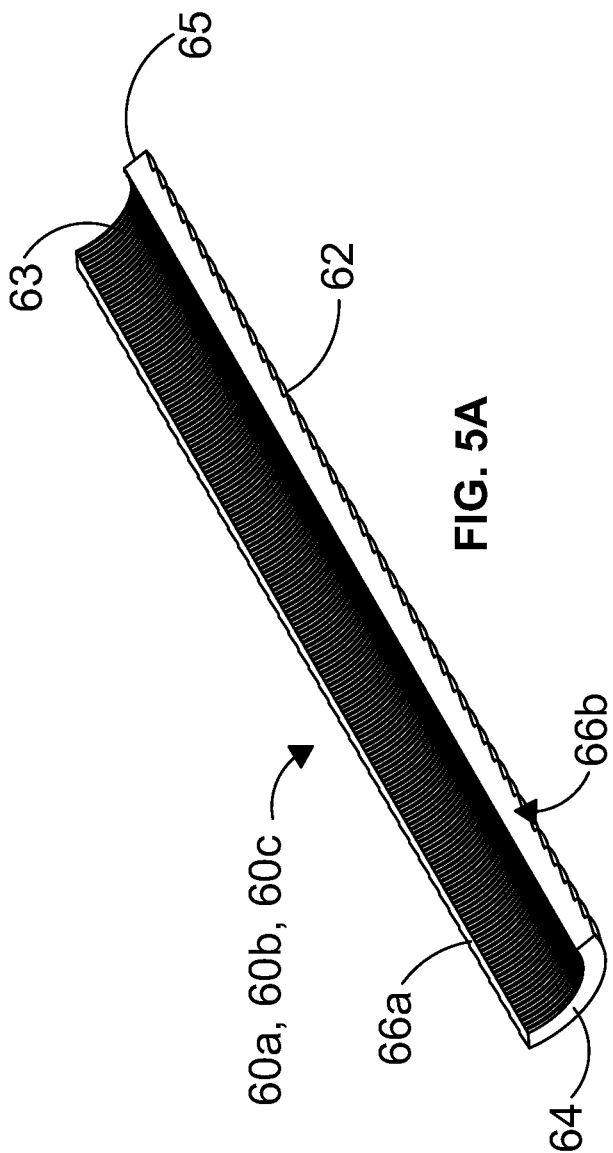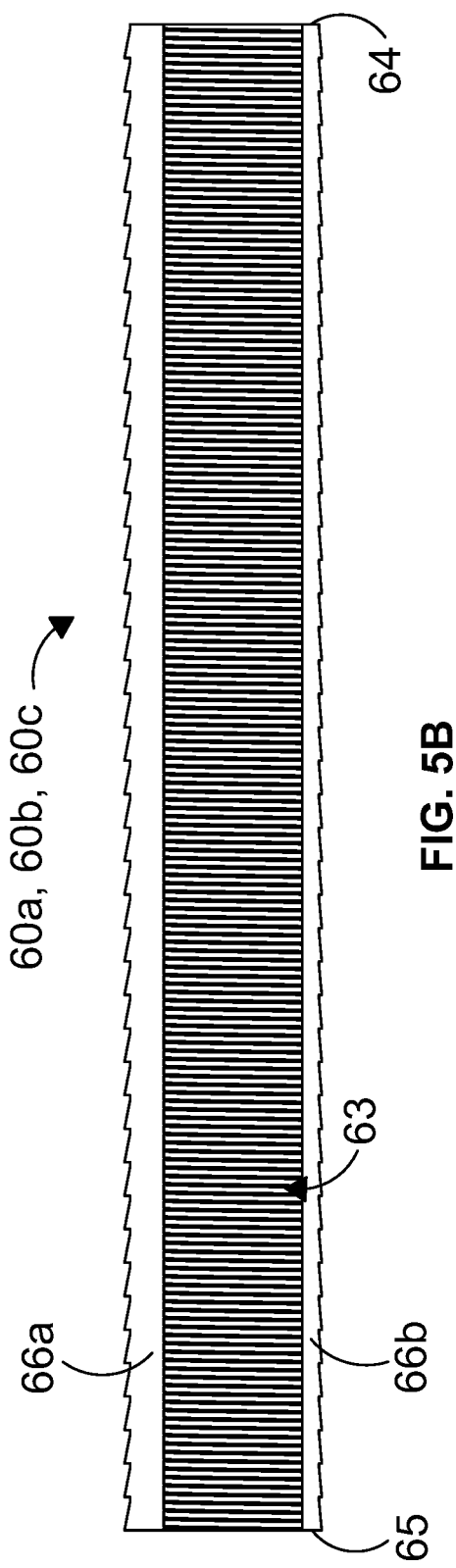

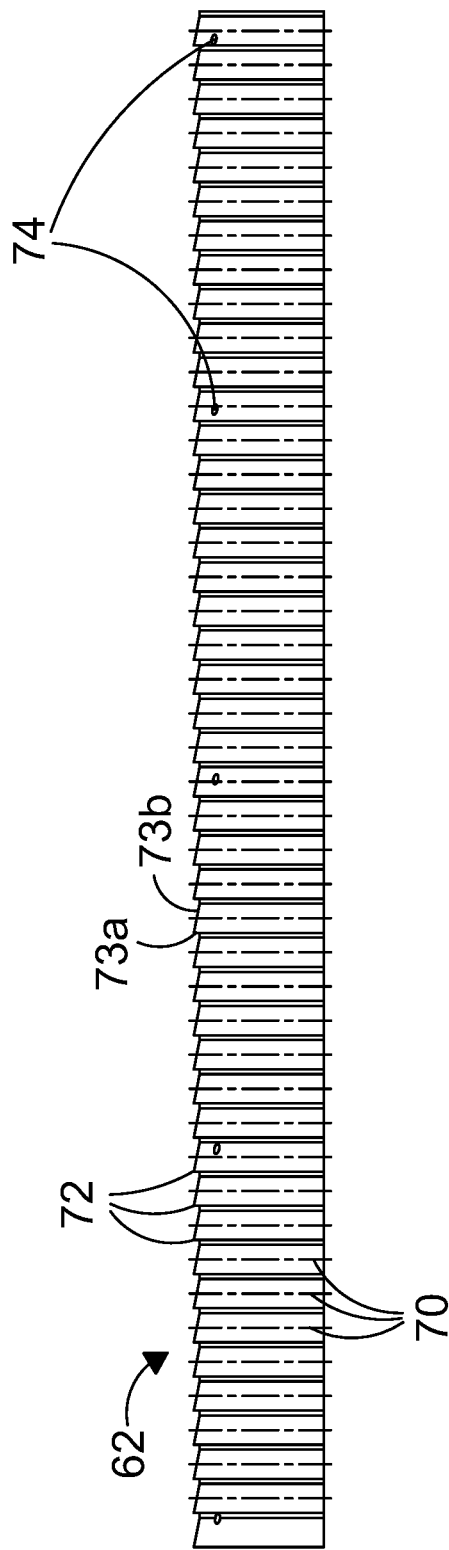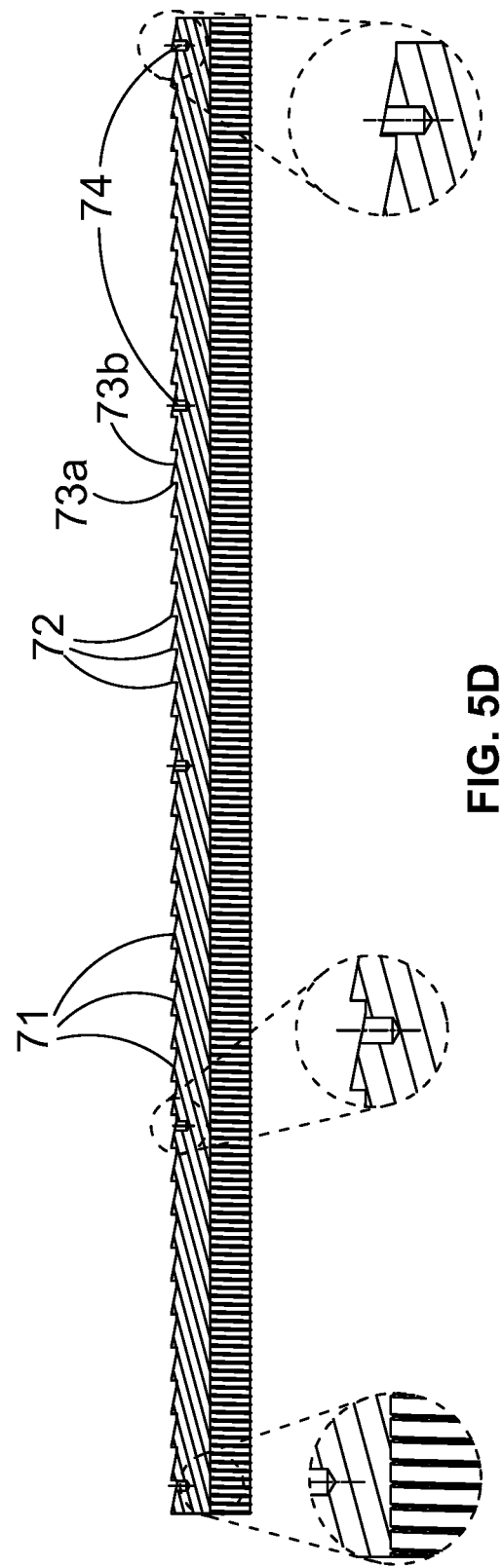
FIG. 5C
FIG. 5D

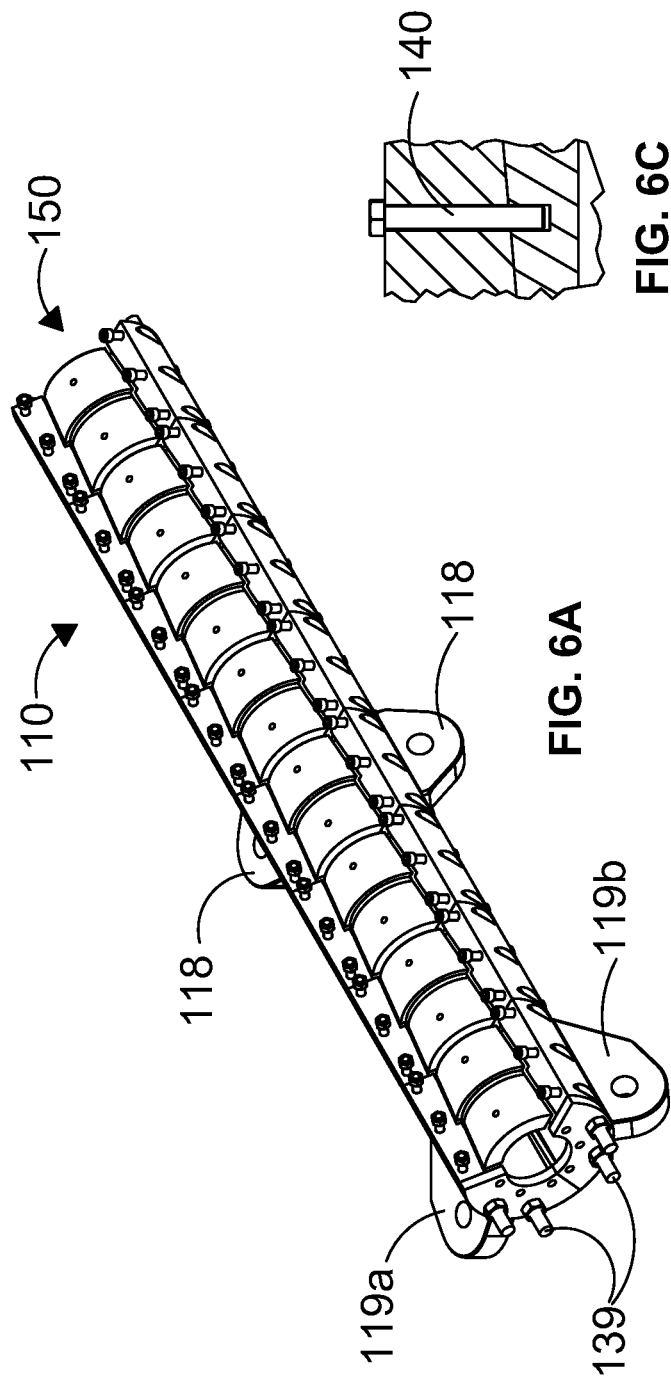
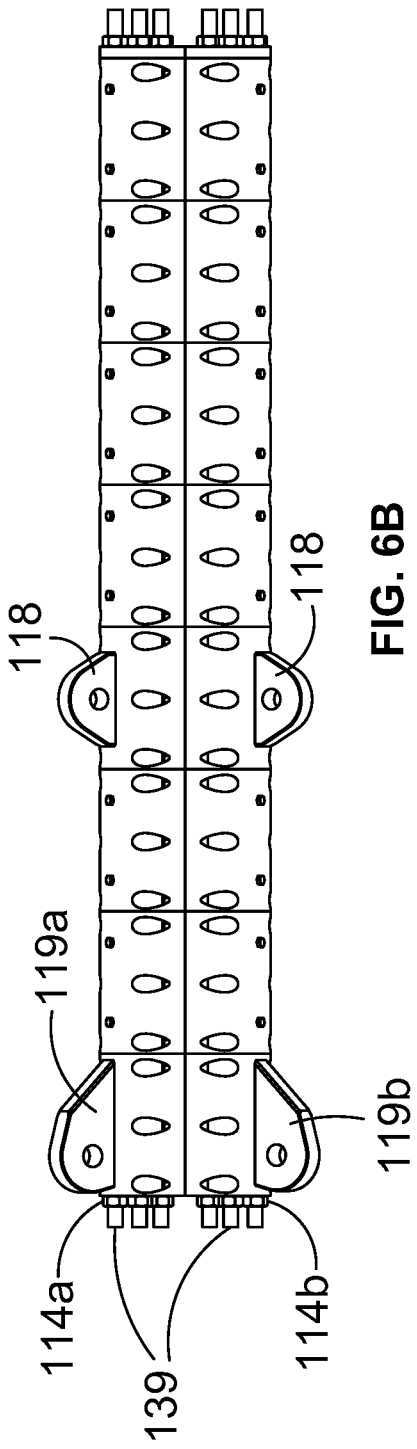
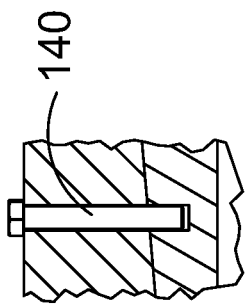
FIG. 6A
FIG. 6B
FIG. 6C

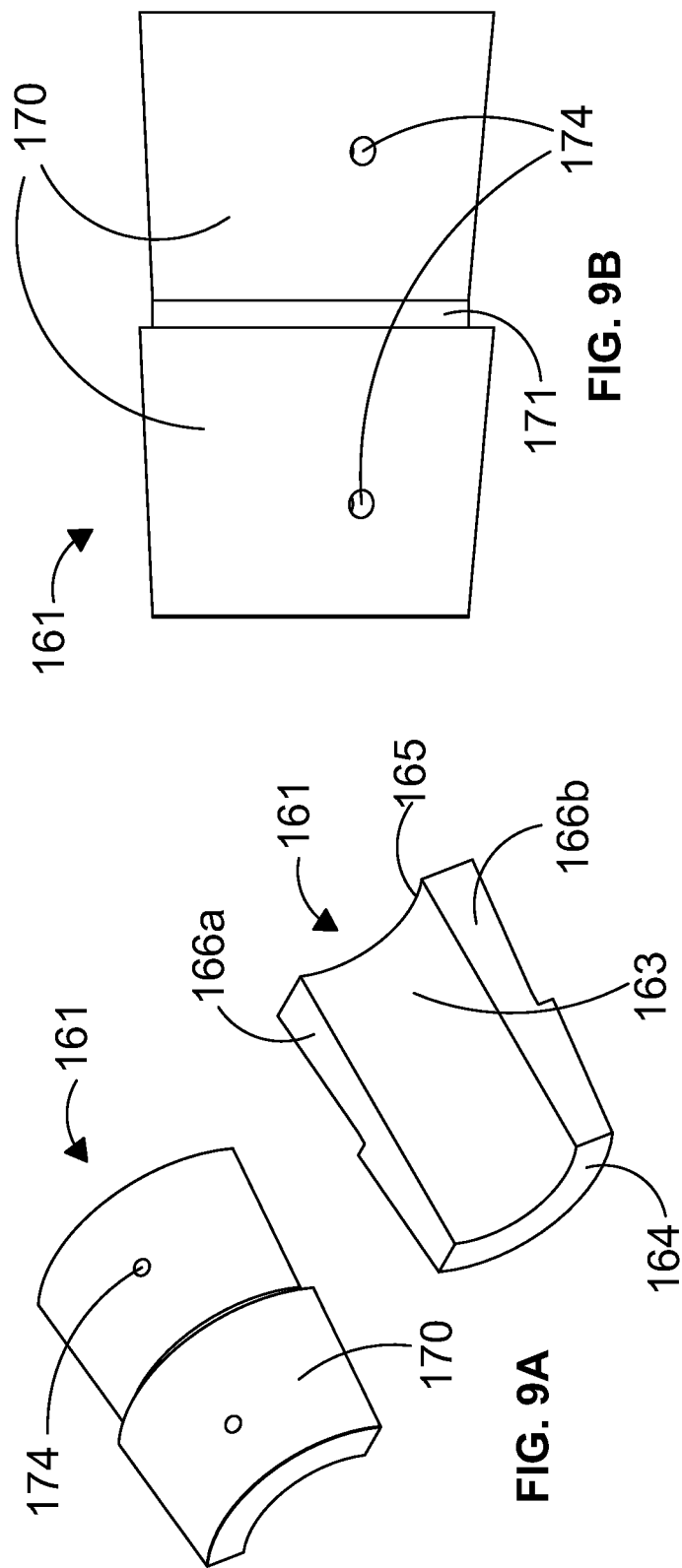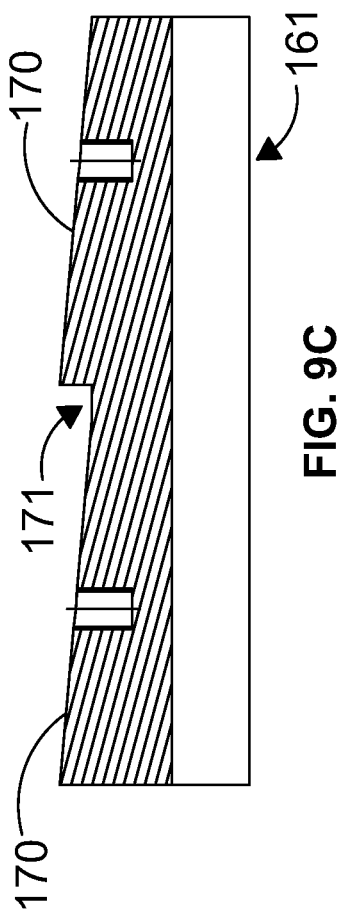
FIG. 9A
FIG. 9B
FIG. 9C

SUBSEA LINE CLAMP ASSEMBLY

The present application relates to subsea line clamp assembly adapted to anchor a submerged line such as a marine riser conduit to a seabed anchor such as a suction pile.

In the production of oil or gas from a subsea oil well, the production fluids are generally recovered to the surface from the well via a production string housed in a marine riser which extends from the surface to the seabed. The marine riser typically connects at the surface to a floating production storage and offloading unit (FPSO) and at the seabed can be connected to a subsea manifold such as a wellhead by a marine riser conduit such as a flowline.

US2017/0350196, US2006/0204338 and US2004/0156684 disclose clamp assemblies useful for understanding the invention.

SUMMARY

According to the present invention there is provided a subsea line clamp assembly, comprising a body having an axis and a clamp member, the body comprising at least two segments adapted to be assembled around a subsea line, the body having an anchor attachment point adapted to tether the body to a subsea anchor, the clamp member being movable relative to the body and having an outer surface adapted to engage an inner surface of the body, and an inner surface adapted to engage the subsea line within the subsea line clamp assembly, the inner surface of the body having at least one first tapered portion, and the outer surface of the clamp member having at least one second tapered portion arranged to engage the first tapered portion on the inner surface of the body.

The subsea line can comprise a conduit such as a marine riser conduit, for example, a marine riser or a conduit that is adapted to connect to a marine riser, such as a flowline or other pipe. Optionally the subsea line can be a cable or other line without necessarily comprising a conduit. Optionally the subsea line can be a tether, for example for a vessel or floating installation such as a floating wind turbine or wave energy generator.

Optionally the tapered portions can form part of a repeating pattern on the body and the clamp member. The pattern can optionally comprise a saw-tooth pattern formed by teeth. Optionally each tooth has a first face and a second face. Optionally each first face is tapered and optionally the tapered portion is formed on the first face. Optionally each second face is perpendicular to the axis of the body, or is tapered at a steeper angle than the first face. Optionally the first face on the body engages the first face on the clamp member, and the first faces on the body and the clamp member optionally face opposite ends of the subsea line clamp assembly.

Optionally each first tapered portion on the body forms part of a tooth, having a first face extending radially inward towards the clamp member from an outer radial position spaced from the axis of the body to an inner radial position closer to the axis of the body and forming the first tapered portion, and a second face extending radially outward from the inner radial position back to the outer radial position with respect to the axis of the body. Optionally adjacent teeth on each of the body are separated by an axis-parallel portion of the inner surface of the body, arranged parallel to the axis of the body. Optionally the axis-parallel portion extends between adjacent teeth, e.g. between the second portion of one tooth and the first portion of the adjacent tooth, and optionally between the end of the first face and the beginning of the second face. The axis-parallel portion is typically on a peak between the teeth, radially close to the axis of the body, optionally in the inner radial position. Optionally the teeth in the body are identical.

Optionally each second tapered portion on the clamp member forms part of a tooth, having a first face extending radially inward towards the bore of the clamp assembly from an outer radial position with respect to the axis of the body to an inner radial position closer to the axis and forming the tapered portion, and a second face extending radially outward from the inner radial position back to the outer radial position with respect to the axis of the body. Optionally the second faces are perpendicular to the axis. Optionally adjacent teeth on the clamp member are separated by an axis-parallel portion of the clamp member, arranged parallel to the axis of the body. Optionally the axis-parallel portion extends between adjacent teeth, e.g. between the second portion of one tooth and the first portion of the adjacent tooth, and optionally between the end of the second face and the beginning of the first face. The axis-parallel portion is typically in a trough between the teeth, radially close to the axis of the body, i.e. in the inner radial position. Optionally the teeth in the clamp member are identical. Optionally axis-parallel portions on the body and clamp member at least partially overlap in a direction along the axis of the body.

Optionally the clamp member is radially movable relative to the body. Optionally the clamp member is axially movable relative to the body, optionally in only one direction. Optionally the clamp member is radially and axially movable relative to the body. Axial movement of the clamp member in a first direction when the first and second tapered portions are engaged typically urges the clamp member in a radial direction relative to the body, e.g. inwards from the body, against the subsea line. Optionally the second face on the body engages the second face on the clamp member and the second faces on the body and the clamp member optionally face opposite ends of the subsea line clamp assembly. Optionally engagement of the second faces resists axial movement of the clamp member relative to the body in a second direction. Optionally sliding of the first and second tapered surfaces against one another during axial movement of the clamp member relative to the body in the first direction urges the inner surface of the clamp member against the outer surface of the subsea line. Optionally the maximum extent of axial movement of the clamp member relative to the body in the first direction, optionally between a first position in which the second faces of the tapered portions of the clamp member are engaged with the second faces of the tapered portions of the body, and a second position in which the second faces of the clamp member have greatest axial separation from the second faces of the body, corresponds to between 5% and 15% (optionally 8% to 12%) of an axial dimension of the first and second tapered portions.

Optionally the subsea line clamp assembly is adapted to hold an axial load on the subsea line greater than 50 tons, optionally greater than 100 tons, optionally greater than 200 tons.

Optionally the inner surface of the body has more than one tooth, optionally an array of teeth. Optionally the tapered portions are annular, extending around at least a portion of the inner surface of the clamp member. Optionally the inner surface of the body comprising the first tapered portion(s) could be formed on a separate component attached to another component to form the body. Optionally the outer surface of the clamp member has more than one tooth, optionally an array of teeth. Optionally the teeth are annular, extending around at least a portion of the outer surface of the clamp member. Optionally the outer surface of the clamp member comprising the second tapered portion(s) could be formed on a separate component attached to another component to form the clamp member. Optionally the first and second tapered portions are tapered at the same angle relative to an axis of the body.

The radial depth of the tapered portions can vary in different examples. Optionally the radial depth of at least one of the first and second tapered portions (e.g. the distance between the radial maximum and minimum of the tapered portion) is greater than the maximum radial deflection of the subsea line over the service life of the subsea line. The outer diameter of the subsea line may decrease when submerged at depth, and/or may decrease in response to environmental conditions, and/or may decrease naturally over time e.g. due to creep. Reduction in the outer diameter of the subsea line may occur principally due to contraction of an insulation layer on the outer surface of the mariner riser conduit. Larger radial depth of the first and second tapered portions is optionally useful for subsea lines with high compression factors, and smaller radial depth is optionally useful for subsea lines made from stiffer materials with lower compression factors. The maximum range of radial deflection e.g. the maximum range of outer diameter of the subsea line over the service life of the subsea line may be quantifiable, or may be a known parameter of the material used for the subsea line or its insulation. Optionally the radial depth of the first and second tapered portions is greater than the maximum anticipated contraction of outer diameter of the subsea line over the service life of the subsea line. Optionally the radial depth of the first and second tapered portions are approximately equal.

Optionally the radial force applied to the outer surface of the subsea line by the inner surface of the clamp member is related to the angle of the tapered portions relative to the axis of the body. Optionally the angle of the tapered portions relative to the axis of the body ranges from 45 to 3 degrees, optionally from 25 to 5 degrees, optionally from 15 to 10 degrees. In some examples, an angle of from 3 degrees to 15 degrees is especially useful.

Optionally the axial length of the first and second tapered portions, optionally in a direction parallel to the axis of the body, is related to the respective angles of the first and second tapered portions, and optionally is related to the respective radial depths of the first and second tapered portions. Optionally the axial length of the first and second tapered portions is dependent upon, optionally determined by, both the angles and radial depths of the first and second tapered portions.

Optionally the clamp member is segmented. Optionally the clamp member can comprise three longitudinal segments, but two can suffice in some cases. In addition to being divided longitudinally, the clamp member can optionally be divided circumferentially, optionally into two axial sections, optionally into three, four, five or more axial sections. Optionally the axial sections of the clamp member can have approximately equal axial length. Optionally each axial section of the clamp member can comprise a whole number of tapered portions, optionally two, three or more tapered portions.

Optionally the body can comprise three longitudinal segments, but two can suffice in some cases. The body can also be divided circumferentially, optionally into two axial sections, optionally into three, four, five or more axial sections. Optionally the axial sections of the body can have approximately equal axial length. Optionally each axial section of the body can comprise a whole number of tapered portions, optionally two, three or more tapered portions.

Optionally each axial section of the clamp member has the same number of tapered portions as each axial section of the body. Optionally the axial length of each axial section of the clamp member is less than the axial length of each respective axial section of the body. Optionally the axial sections of the body are connected to each other by fasteners, optionally bolts. Optionally each fastener extends through the axial length of the entire body.

Optionally the clamp member can be fixed to the body (e.g. to one or more body segments) during installation of the clamp assembly onto the subsea line, but can be released from the body following installation, to permit movement of the clamp member relative to the body during operation. Optionally the clamp member and the body are divided in a direction along the axis into the same number of segments, with each body segment having a respective clamp member segment. Optionally the body segments have a larger angular dimension than the clamp member segments. Optionally each body segment has a larger angular dimension than a respective clamp member segment. Optionally clamp member segments are divided along the axis of the body by a space when the body segments are assembled. Optionally the body segments are adapted to be fixed together by threaded fixings such as bolts.

Optionally the inner surface of the clamp member comprises a high friction material. Optionally the inner surface of the clamp member is formed or faced with a pattern such as ridges or grooves increasing the frictional coefficient of the inner surface of the clamp member. Optionally the inner surface of the body and the outer surface of the clamp member are faced or formed by a low friction material, such as PTFE or the like, such that friction between the inner surface of the body and outer surface of the clamp member is lower than the friction between the inner surface of the clamp member and the outer surface of the subsea line.

Optionally the outer surface of the clamp member and the inner surface of the body incorporate a stop member restricting axial movement of the clamp member in a second direction opposite to the first direction. Optionally the stop member can comprise the second faces of the teeth.

Optionally the clamp member is pre-energised, or pre-loaded, optionally after the subsea line is received into the bore of the clamp assembly, and optionally before the subsea line exerts axial load on the clamp assembly. Optionally when the clamp member is pre-energised, the clamp member exerts a radial force, optionally a minimum radial force, on the outer surface of the subsea line, optionally before the subsea line exerts any axial load on the clamp assembly, optionally when there is no significant axial load on the clamp assembly.

Optionally the clamp member is pre-energised by one or more fixings, optionally fasteners, optionally bolts. Optionally the one or more fixings are orientated axially, and optionally urge movement, optionally axial movement, of the clamp member in the first direction relative to the body. Optionally the one or more fixings cause the clamp member to exert increased radial force on the outer surface of the subsea line. Optionally the one or more fixings extend axially through an end surface of the body, and optionally engage with an end surface of the clamp member. Optionally one or more apertures, optionally disposed circumferentially around an end surface of the body, are adapted to receive the one or more fixings for pre-energising the clamp member.

Optionally the inner surface of the body, optionally the inner surfaces of the body segments, are radially spaced from the outer surface of the subsea line. Optionally the radial dimension of the clamp member, optionally the radial dimension of the clamp member segments, is equal to, or optionally larger than, the radial spacing between the body and the subsea line. Optionally the clamp member is pre-energised when the radial dimension of the clamp member is greater than the radial dimension of the radial spacing between the body and the subsea line, optionally when the radial dimension of the clamp member is from 100% to 110% of the radial spacing between the inner surface of the body and the outer surface of the subsea line.

Optionally the body is formed from a metal, optionally steel. Optionally the clamp member is formed from a metal, optionally steel. Optionally the body, or optionally the clamp member, may be formed from non-metallic materials, optionally synthetic materials, for example synthetic composite materials such as a fibre-reinforced plastic or fibre-reinforced polymer (FRP), or carbon fibre reinforced polymer.

The invention also provides a subsea line clamp assembly, comprising:
  a body having an axis and being divided into segments adapted to be assembled around a subsea line, the body having an anchor attachment point adapted to tether the body to a subsea anchor,
  a clamp member having an outer surface adapted to engage an inner surface of the body extending circumferentially around the outer surface of the clamp member, and an inner surface adapted to engage the subsea line within the subsea line clamp assembly, wherein at least one segment of the clamp member is radially and axially movable relative to the body when the assembly is assembled around the subsea line,
  the inner surface of the body having a plurality of first tapered portions and the outer surface of the clamp member having a plurality of second tapered portions arranged to engage the first tapered portions on the inner surface of the body during movement of the clamp member relative to the body, wherein the first and second tapered portions face opposite ends of the subsea line clamp assembly, and wherein axial movement of the clamp member in a first direction relative to the body when the first and second tapered portions are engaged urges the inner surface of the clamp member radially inwards with respect to the body.

The invention also provides a method of clamping a subsea line, comprising assembling a subsea line clamp assembly onto an outer surface of the subsea line, the subsea line clamp assembly comprising:
  a body having an axis and being divided into segments adapted to be assembled around the subsea line, the body having an anchor attachment point adapted to tether the body to a subsea anchor,
  a clamp member having an outer surface adapted to engage an inner surface of the body extending circumferentially around the outer surface of the clamp member, and an inner surface adapted to engage the subsea line within the subsea line clamp assembly, wherein at least one segment of the clamp member is radially and axially movable relative to the body when the assembly is assembled around the subsea line,
  the inner surface of the body having a plurality of first tapered portions and the outer surface of the clamp member having a plurality of second tapered portions arranged to engage the first tapered portions on the inner surface of the body during movement of the clamp member relative to the body, wherein the first and second tapered portions face opposite ends of the subsea line clamp assembly, and wherein friction between the inner surface of the body and outer surface of the clamp member is lower than the friction between the inner surface of the clamp member and the outer surface of the subsea line, and wherein:
  axial movement of the clamp member in a first direction relative to the body when the first and second tapered portions are engaged urges the inner surface of the clamp member radially inwards with respect to the body against the outer surface of the subsea line.

One advantage arising from the combination of features in some examples of the invention is that in addition to applying a clamping force on the subsea line when initially assembled around it, examples of the present assembly enable maintenance of a consistent clamping force throughout the service life of the subsea line, despite the actions of creep and compression acting to reduce the outer diameter of the conduit. Reduction in the outer diameter of the subsea line naturally occurs over time as a result of gradual degradation or compression of the outer layer of insulation, or creep arising from tension. As this reduction progresses, the first and second tapered portions are able to slide relative to one another and maintain a relatively consistent clamping force on the outer diameter of the conduit. Thus, as the outer diameter of the subsea line reduces over its service life, the clamping force does not reduce to the same extent. This advantage enables more consistent performance of the clamp over the service life of the subsea line, and reduces the risks of uncontrolled escape of hydrocarbons from connections between or through the subsea line and manifolds such as pipeline end terminations.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

BRIEF DESCRIPTION OF THE DRAWINGS

In the accompanying drawings:

FIGS. 3A-3G show different views of the FIG. 2 subsea line clamp assembly:

FIGS. 4a-4d show different views of the body segments of the FIG. 2 subsea line clamp assembly:

FIGS. 5a-5d show different views of the clamp member of the FIG. 2 subsea line clamp assembly:

FIGS. 6a-6f show different views of a second example of a subsea line clamp assembly:

FIGS. 9a-9c show different views of the clamp member sections of the FIG. 6 subsea line clamp assembly.

DETAILED DESCRIPTION

Figure 1A:
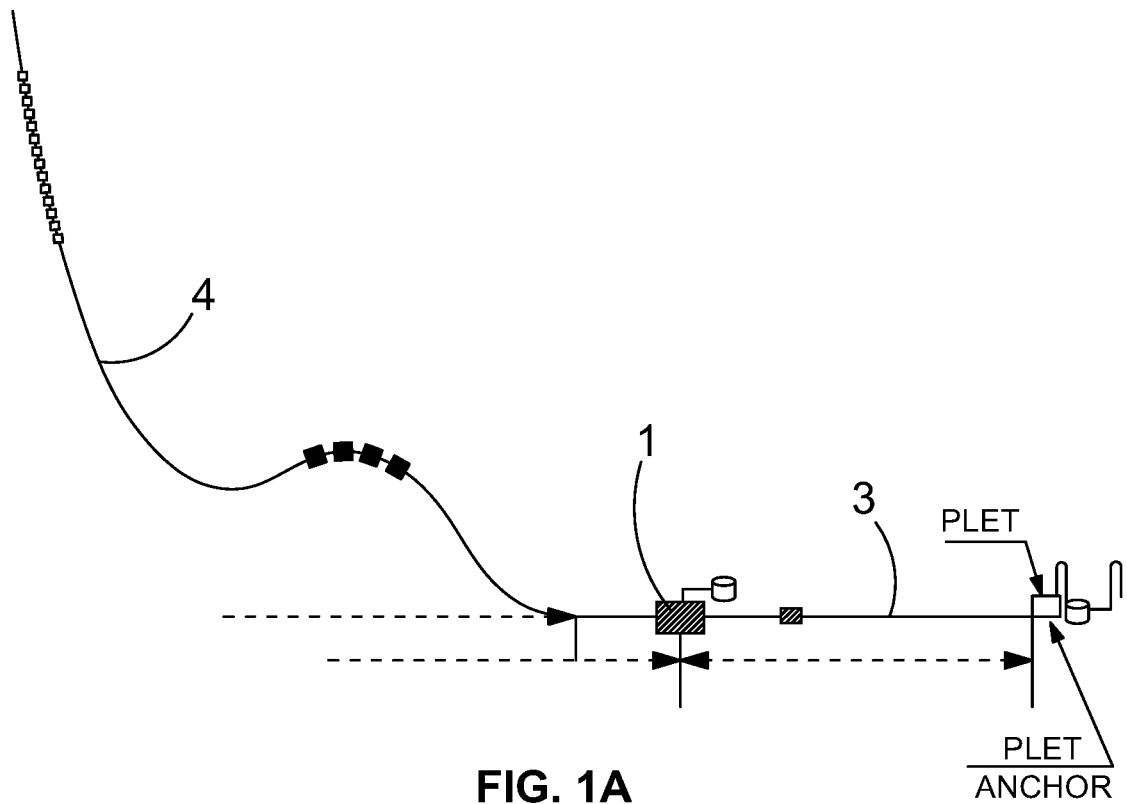
FIGS. 1a and 1b show schematic side and perspective views of a system for anchoring a subsea line such as a marine riser.

Referring now to the drawings, a first example of an installation of a subsea line clamp assembly 1 is illustrated in FIG. 1a. A subsea line in the form of a marine riser conduit or flowline 3 (which can be a separate pipe adapted to connect to a marine riser 4 or can simply be an extension of the marine riser 4) extends along the seabed between a floating production storage and offloading unit (FPSO) and a pipeline end termination (PLET), such as a wellhead. The FPSO may be prone to movement due to e.g. wave action, swell or weather conditions. Any movement of the FPSO generally toward the PLET may be accommodated by buoyant sections of the riser 4 which connects the flowline 3 to the FPSO, but any significant movement of the FPSO away from the PLET could result in the flowline 3 being stretched and causing tension, strain or even disconnection of the flowline from the PLET. Therefore, movement of the flowline 3 away from the PLET is restricted by subsea line clamp assembly 1, which is secured or tethered by cables or chains 6a, 6b to one or more (typically two) anchoring devices such as suction piles 5a, 5b seen in FIG. 1b.

Figure 2A:
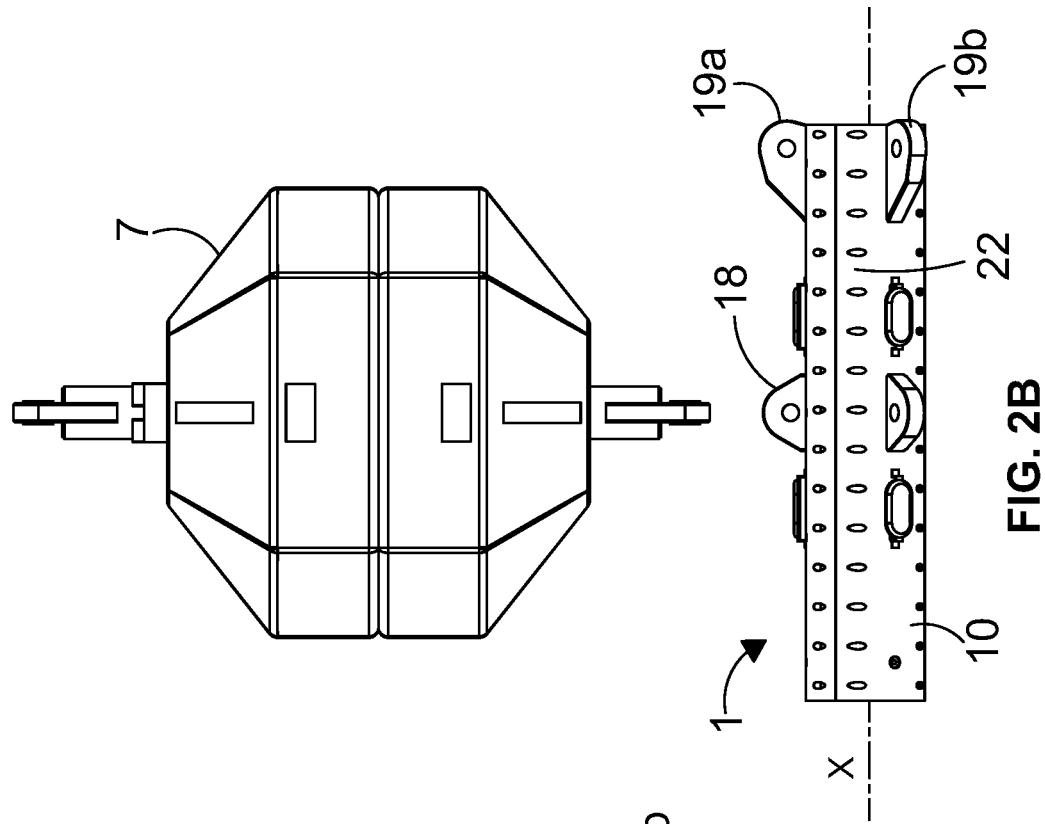
FIGS. 2a and 2b show front and perspective views of a subsea line clamp assembly for use the in the system of FIG. 1.
Figure 2B:
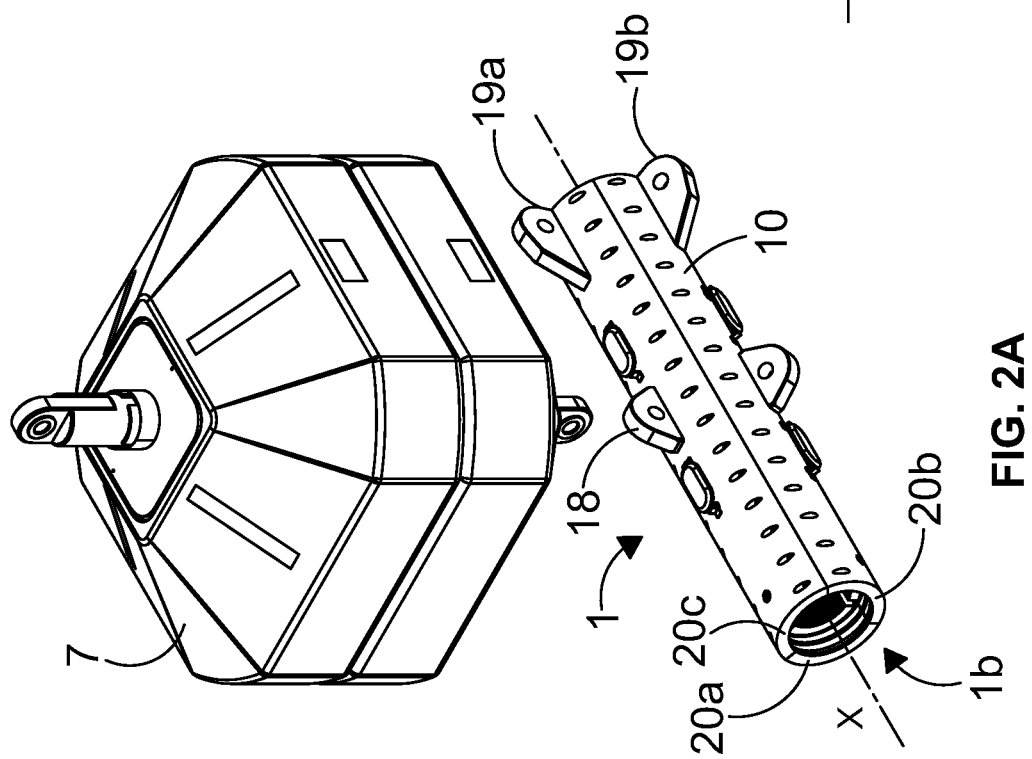

The exterior of the riser clamp assembly 1 according to a first example of the invention is shown in FIGS. 2a and 2b. The riser clamp assembly 1 generally comprises a cylindrical conduit with a bore 1b having an axis X. As will be explained in further detail below, the riser clamp assembly comprises a body 10 and a clamp member 50 arranged inside the body 10. Only the body 10 is visible in FIGS. 2a and 2b. The body 10 is generally cylindrical, and in this example comprises three equal longitudinal segments 20a, 20b and 20c, seen in FIG. 2a. The divisions between segments 20a, 20b, 20c are approximately equally spaced around the outer circumference of the body 10, and are parallel with the axis X of the bore 1b of the riser assembly 1. In other examples, the body 10 may comprise fewer than three segments e.g. only two segments, or there may be more than three segments, and the divisions between the segments need not be regularly spaced around the outer circumference of the body 10, nor be parallel with the axis X of the bore 1b.

As shown in FIGS. 2a and 2b, one or more padeyes are disposed on the outer surface 22 of the body 10. In this example one or more first padeyes 18 are optionally adapted for connection to one or more buoyancy modules 7, which support the weight of the riser clamp assembly 1, and optionally also the weight of an end portion of the cables or chains 6a, 6b closest to the riser assembly 1. In other words, the combined riser clamp assembly 1 and buoyancy module 7 are approximately neutrally buoyant, or slightly negatively buoyant, and the buoyancy module optionally prevents the riser clamp assembly 1 from settling or sinking into material on the seabed such as mud or silt.

Figure 1B:
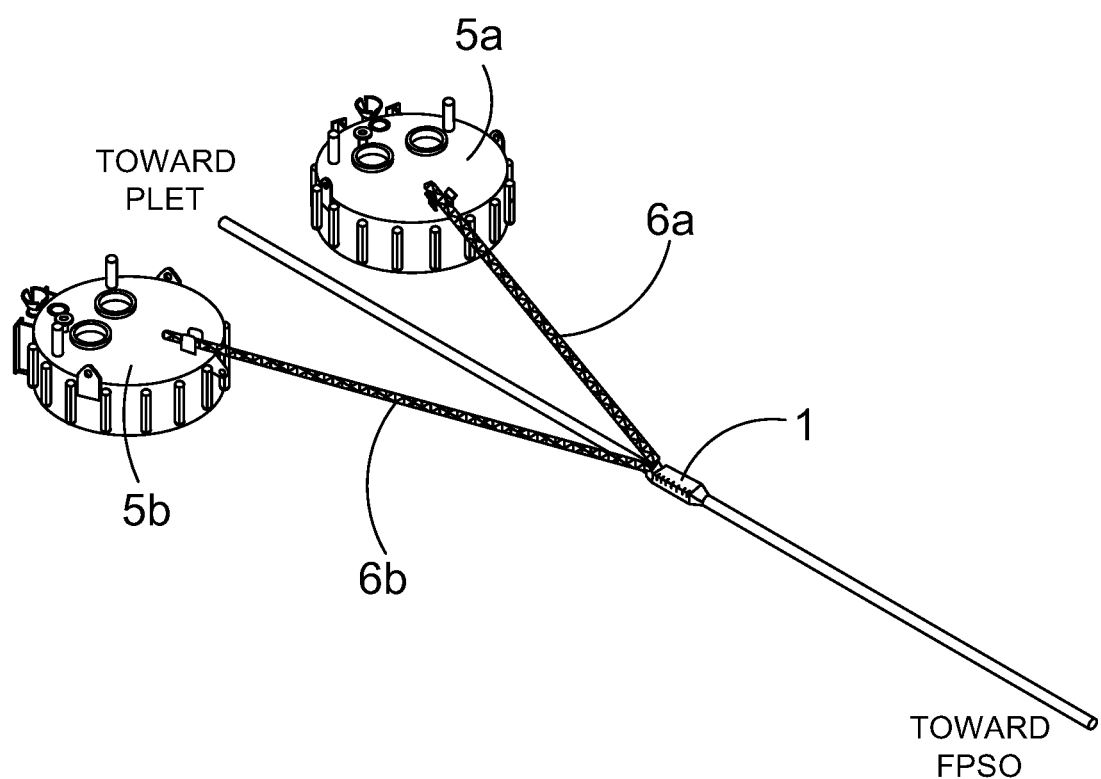

Also in this example, second padeyes 19a, 19b are also disposed on the outer surface 22 of the body 10. Padeyes 19a, 19b are adapted for connection to the chains 6a, 6b which tether the riser clamp assembly 1 to the suction piles 5a, 5b, as shown in FIG. 1b.

Figure 3C:
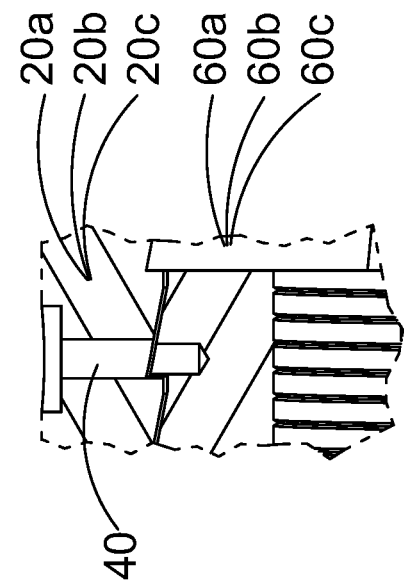
Figure 3D:
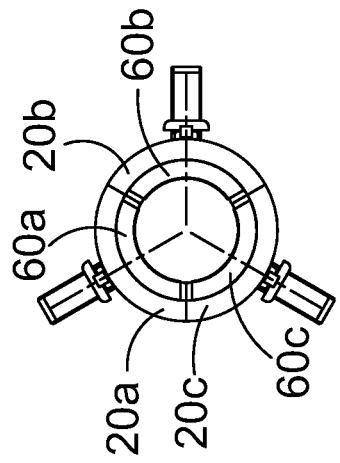
Figure 3A:
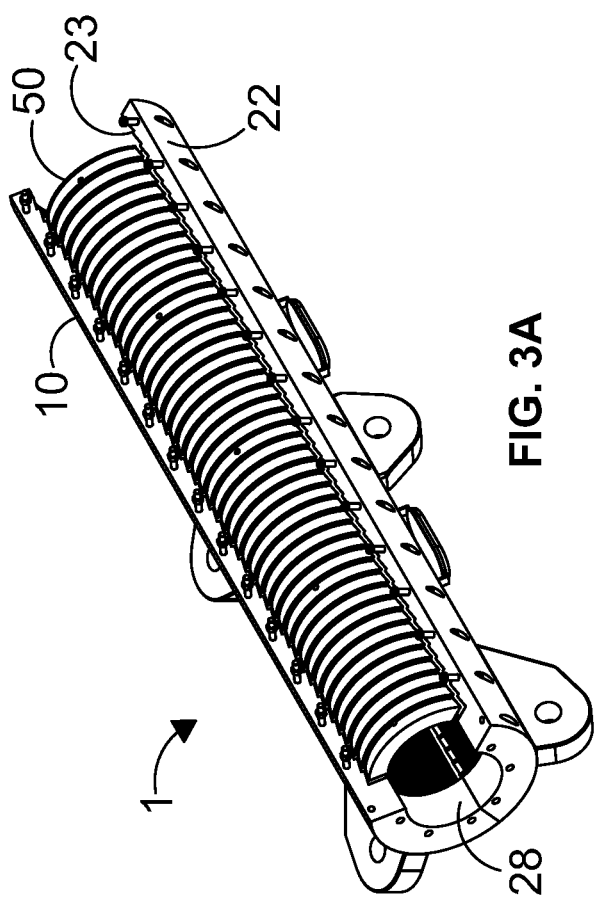
Figure 3B:
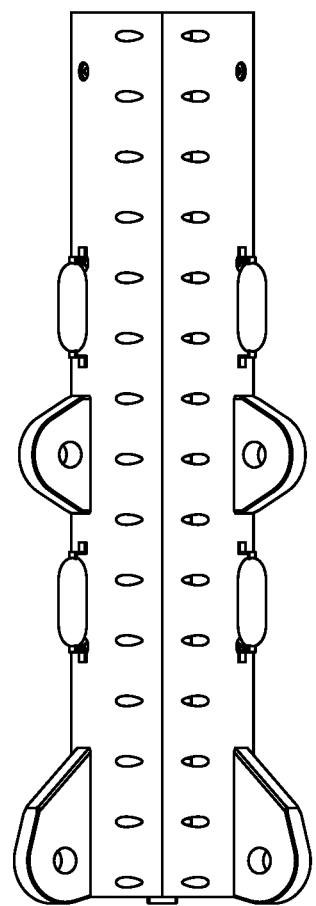

As best seen in FIGS. 3a and 3e, the inner surface 23 of the body 10 closest to the FPSO is recessed (e.g. counterbored) along a majority of the axial length of the body. A radial shoulder 28 is formed in the inner surface 23 of the body 10, adjacent to the end of the body 10 closest to the PLET. In this example the depth or radial dimension of the shoulder 28 is approximately equal to the wall thickness of the clamp member 50, so that the inner diameter of the clamp member 50 is approximately equal to, and continuous with, the inner diameter of the body 10 adjacent to the recessed portion of the body 10. In other words, in this example, the inner diameter of the bore 1b of the riser clamp assembly 1 is approximately constant along the entire axial length of the riser clamp assembly.

Each of the outer segments 20a, 20b, 20c of the body 10 (seen in FIG. 3d) are shown in detail in FIGS. 4a to 4d. The inner surface 23 of the recessed portion of each segment 20a, 20b, 20c comprises a plurality of annular tapered portions 30, although one would suffice. When the segments 20a, 20b, 20c of the body 10 are assembled as shown in FIGS. 2a and 2b, each tapered portion 30 tapers from a larger inner diameter of the body 10 to a smaller inner diameter. The maximum inner diameters of the annular tapered portions 30 are all approximately equal, and the minimum inner diameters of the annular tapered portions are also approximately equal. The maximum inner diameter of each tapered portion is disposed immediately adjacent to the minimum inner diameter of the next tapered portion, and vice versa. In this example the taper of each tapered portion 30 is constant, or in other words, the inner surface of each tapered portion makes a constant angle with the axis X of the bore 1b of the riser clamp assembly 1. Also in this example, the inner surface 23 also comprises a small optional axis-parallel portion 31 (best seen in FIG. 4d) adjacent to the minimum inner diameter of each tapered portion, i.e. at the peaks between adjacent teeth. The axis-parallel portions 31 can be formed to allow for manufacturing tolerances in the formation of the 'peaks' of the minimum inner diameters of each of the annular tapered portions 30, to ensure consistent engagement of the tapered portions 30 of the body 10 with the tapered portions 70 of the clamp member 50.

Thus, the annular tapered portions 30 of the inner surface 23 of each body segment 20a, 20b, 20c form a series of protrusions or teeth 32 which extend radially inward from the inner surface of each body segment. In this example, the axis-parallel portions 31 of the inner surface 23 of the body segments 20a,b,c are located at the peaks between adjacent teeth 32. In this example, the axis-perpendicular face 33a of each tooth 32 facing the end 25 of each body segment 20a, 20b, 20c nearest the PLET is approximately perpendicular to the axis X of the bore 1b (it need not be precisely perpendicular) and the tapered face 33b of each radial tooth 32 facing the end 24 of each body segment nearest the FPSO makes an angle of from 3 degrees to 45 degrees with the axis X of the bore 1b, optionally from 5 degrees to 25 degrees, optionally from 10 degrees to 15 degrees. In this example, the tapered faces 33b have an angle of 11 degrees to the axis X.

Each of the inner segments 60a, 60b, 60c of the clamp member 50 (seen in FIG. 3d) are shown in detail in FIGS. 5a to 5d. The inner segments 60a, 60b, 60c of the clamp member 50 are generally similar in form to the outer segments 20a, 20b, 20c of the body 10, but the inner segments comprise a plurality of annular tapered portions 70 on their outer surfaces 62, which are adapted to engage with the annular tapered portions 30 on the inner surfaces 23 of the outer segments 20a, 20b, 20c. Also in this example, the tapered portions 70 on the outer surface 62 of the inner segments 60a, 60b, 60c extend along the entire axial length of each of the inner segments. In a corresponding manner to the tapered portions 30 of the body segments 20a, 20b, 20c, each tapered portion 70 of the clamp member segments 60a, 60b, 60c comprises a larger outer diameter of the clamp member 50, and a smaller outer diameter of the clamp member 50. The maximum outer diameters of the annular tapered portions 70 are all approximately equal, and the minimum outer diameters of the annular tapered portions 70 are also approximately equal. The maximum outer diameter of each tapered portion 70 is disposed immediately adjacent to the minimum outer diameter of the next tapered portion, and vice versa. In this example, the taper of each tapered portion 70 is constant, or in other words, the outer surface of each tapered portion 70 makes a constant angle with the axis X of the bore 1b of the riser clamp assembly 1. In this example, similar to the tapered portions 30 of the outer segments 20a, 20b, 20c of the body 10, the outer surface 62 of each segment 60a, 60b, 60c of the clamp member 60 comprises a small optional axis-parallel portion 71 (best seen in FIG. 5d) of the outer surfaces 62 adjacent to the minimum outer diameter of each tapered portion i.e. in the troughs between adjacent teeth. The axis-parallel portions 71 can be formed to allow for manufacturing tolerances in the formation of the 'troughs' of the minimum outer diameters of each of the annular tapered portions 70, to ensure consistent engagement of the tapered portions 30 of the body 10 with the tapered portions 70 of the clamp member 50. More specifically, depending on the manufacturing process used to form the body segments 20a, 20b, 20c and clamp member segments 60a, 60b, 60c, which may be for example moulding, forging or CNC milling, the peaks and troughs of teeth 32, 72 of the body segments and clamp member segments respectively can be prone to manufacturing inaccuracies and/or deviations from exact design dimensions. The optional axis-parallel portions 31, 71 of the body segments and clamp member segments respectively introduce a tolerance for deviation from exact design dimensions by relaxing the precision required at the interface between respective peaks and troughs of the teeth 32, 72. In this example, the axis-parallel portions 31, 71 are radially spaced apart by a radial clearance, permitting deviations in the end portions of the peaks without affecting the sliding of the tapered portions against one another during use. Without the axis-parallel portions 31, 71, any irregularities in the formed teeth 32, 72 could prevent or restrict uniform engagement of the tapered portions 30, 70 of the body 10 and clamp member 50, which in turn could lead to sticking or seizing of the body and clamp member during relative axial movement of the inner surface 23 of the body with the outer surface 62 of the clamp member.

Thus, the annular tapered portions 70 of the outer surface 62 of each clamp member segment 60a, 60b, 60c form a series of protrusions or teeth 72 which extend radially outward from the outer surface of each clamp member segment. In this example, the axis-perpendicular face 73a of each tooth 72 facing the end 65 of each clamp member segment 60a, 60b, 60c nearest the PLET is approximately perpendicular to the axis X of the bore 1b, and the tapered face 73b of each tooth 72 facing the end 64 of each clamp member segment nearest the FPSO also makes an angle of from 3 degrees to 45 degrees with the axis X of the bore 1b, optionally from 5 degrees to 25 degrees, optionally from 10 degrees to 15 degrees. In this example, the tapered faces 73b have an angle of 11 degrees to the axis X.

In this example, each body segment 20a, 20b, 20c describes an arc of approximately 120 degrees, so that when the riser clamp assembly 1 is assembled, the body 10 comprising body segments 20a, 20b, 20c forms a cylinder with a continuous circumference. In contrast, in this example, each clamp member segment 60a, 60b, 60c describes an arc of less than 120 degrees, for example from 100 degrees to 119 degrees. Thus, when the riser clamp assembly 1 is initially assembled around the marine riser conduit, the clamp member 50 comprising clamp member segments 60a, 60b, 60c does not form a cylinder with a continuous circumference, and each clamp member segment is spaced from adjacent clamp member segments by a longitudinal gap between circumferentially adjacent edge faces of the clamp member segments.

Also in this example, the teeth 72 of each clamp member segment 60a, 60b, 60c are coated with a low friction material or layer, for example xylan, in order to reduce friction between teeth 72, 32 of the clamp member and body segments respectively. Furthermore in this example, the inner surface 63 of each clamp member segment 60a, 60b, 60 is coated with a high friction material or layer, such as a rubber layer or sheet. Alternatively or additionally, the inner surface 63 can comprise a profiled or patterned surface, such as ridges or grooves, in order to increase friction between the outer surface of a flowline 3 and the inner surface 63 of the clamp member segments The riser clamp assembly 1 may be assembled around a flowline 3 as follows. The riser clamp assembly 1 is typically fitted to the flowline 3 before the flowline is lowered to the seabed, for example on the deck of a service vessel that deploys the flowline 3 and riser 4, although in some examples, the assembly 1 could be retrofitted to an existing subsea line, for example, using ROVs.

The corresponding segments 20a, 20b, 20c and 60a, 60b, 60c of the body and clamp members 10, 50 are first secured to each other by installation bolts 40, shown in detail in FIG. 3c. The installation bolts 40 serve only to maintain each pair of body and clamp member segments 20a, 60a, 20b, 60b and 20c, 60c in proper alignment with each other while the riser clamp assembly 1 is assembled, and are removed prior to operation of the riser clamp assembly. In this example, five installation bolts 40 are used to join each pair of body and clamp member segments, but the number of installation bolts 40 is not limiting. As best seen in FIGS. 4b. 4c and 5c, a series of apertures 34 are disposed approximately equidistantly along the axial length of the body segments 20a, 20b, 20c, and a series of corresponding circular recesses 74 are disposed approximately equidistantly along the axial length of the outer surfaces 62 of clamp member segments 60a, 60b, 60c. The apertures 34 and recesses 74 of each pair of body and clamp member segments are aligned with each other when each pair of body and clamp member segments are properly orientated with each other for assembly of the riser clamp assembly 1, as best illustrated in FIG. 3a. The apertures 34 extend radially between the inner and outer surfaces 22, 23 of each body segment 20a, 20b, 20c, but the recesses 74 extend radially only a short distance into the outer surface 62 of each clamp member segment 60a, 60b, 60c, as shown in FIG. 3c. Therefore, neither the recesses 74 nor installation bolts 40 extend through the inner surface 63 of the clamp member segments 60a, 60b, 60c.

Figure 4C:
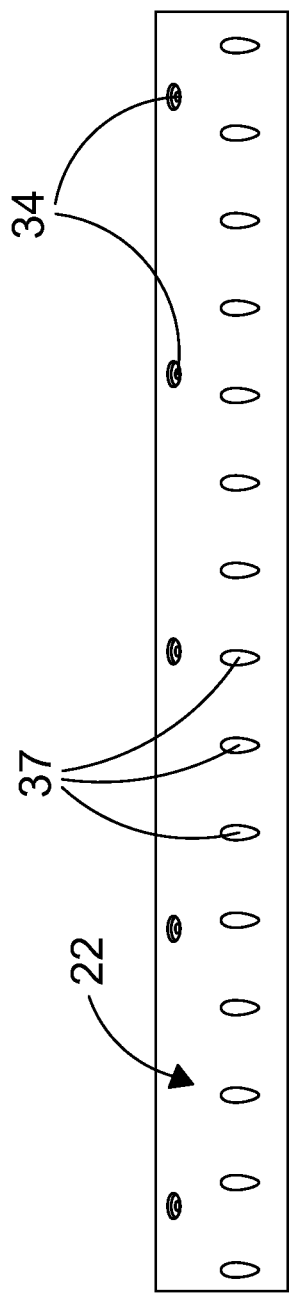
Figure 4D:
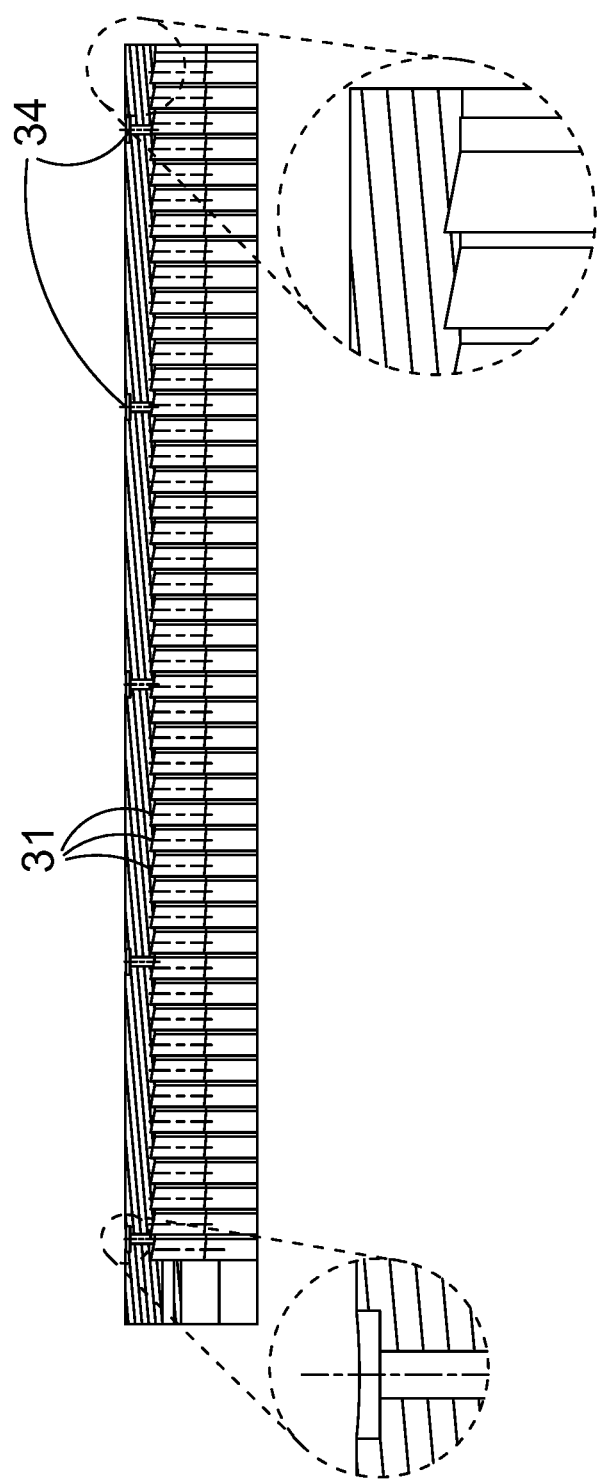

When each pair of body and clamp member segments 20a, 60a, 20b, 60b and 20c, 60c have been secured with installation bolts 40, the body segments 20a, 20b, 20c are assembled to form the complete riser clamp assembly 1. As best seen in FIG. 4b, a series of circular apertures 36 is disposed approximately equidistantly along each circumferential edge face 26a, 26b of each of the body segments 20a, 20b, 20c. In this example, each aperture 36 extends into the wall of each body segment in a direction perpendicular to the circumferential edge faces 26a, 26b until it joins a corresponding recess 37 in the outer surface 22 of each body segment 20a, 20b, 20c, as best seen in FIG. 4c. The body segments 20a, 20b, 20c are assembled by aligning the apertures 36 in each circumferential edge face 26a, 26b of each body segment 20a, 20b, 20c with the apertures 36 of adjacent body segments, such that the body segments 20a, 20b, 20c form a complete cylinder, as best illustrated in FIG. 3a, which shows the riser clamp assembly 1 with one body segment removed for clarity.

When all body segments 20a, 20b, 20c are positioned relative to each other to form a cylinder, fixing bolts or other fasteners (not shown in the Figures) may be passed through the aligned apertures 36 of adjacent body segments and secured in order to clamp the circumferential edge faces 26a, 26b of adjacent body segments to each other.

As best seen in FIGS. 3a and 3d, when the riser clamp assembly 1 in this example is assembled as described above, the circumferential edge faces 26a, 26b of adjacent body segments 20a, 20b, 20c contact each other, and are clamped together by the fixing bolts. However, the circumferential edge faces 66a, 66b of adjacent clamp member segments 60a, 60b, 60c (which are still secured to respective body member segments 20a, 20b, 20c by installation bolts 40) do not contact each other. In other words, clamp member segments 60a, 60b, 60c are circumferentially spaced from each other by a gap between adjacent circumferential edge faces 66a, 66b.

Before the riser clamp assembly 1 is deployed, for example before the section of flowline 3 around which the riser clamp assembly is fitted is lowered toward the seabed, the installation bolts 40 are removed from the body 10 (although the bolts 40 could optionally be removed subsea, for example, if the assembly 1 is installed on an existing subsea line). After removal of the bolts 40, the clamp member segments 60a, 60b, 60c are then no longer fixed to the body segments 20a, 20b, 20c, and are free to move relative to the body segments. However, the inner diameter of the clamp member 50 comprising clamp member segments 60a, 60b, 60c is typically sized to be approximately equal to the outer diameter of the flowline 3 passing through bore 1b of the riser clamp assembly 1, and so the tapered profile of the outer surface 62 of each clamp member segment 60a, 60b, 60c remains in contact with the tapered profile of the inner surface 23 of each body segment 20a, 20b, 20c even after the installation bolts 40 are removed.

In this example, before the riser clamp assembly 1 is exposed to any axial loads from the flowline 3 (and typically before the riser clamp assembly is lowered to the seabed) the clamp member 50 is pre-energised. The purpose of pre-energising the clamp member 50 is to artificially introduce a small amount of axial movement between the clamp member 50 and the body 10, which in turn causes the clamp member segments 60a, 60b, 60c to exert a radial force on the outer surface of the flowline 3, before there is any actual axial load on the flowline. This ensures that the inner surfaces 63 of the clamp member segments are in full contact with the outer surface of the flowline 3, and optionally reduces any risk of the flowline 3 'slipping' relative to the clamp member 50 when the flowline is axially loaded during normal operations. In this example, the clamp member 50 is pre-energised by the introduction of one or more axially-moveable elements, typically with external threads, such as bolts (not shown in the Figures), into axially-threaded bores 29 disposed circumferentially around the end face 25 (on the shoulder 28) of the body 10, as best seen in FIGS. 3e and 4a. In this example three bores 29 are equally spaced around the end faces 25 of each of the body segments 20a, 20b, 20c, but in other examples there may be fewer or more bores 29, and in yet other examples the means for pre-energising the clamp member 50 may not require axial bores or threaded fixings.

The threaded bores 29 extend axially through the shoulder 28 of the body 10, as best seen in FIG. 3e, are positioned radially so that the inner end of each bore 29 opens onto the counterbored portion of the body. Since the radial dimension of the shoulder 28 is approximately equal to the wall thickness of the clamp member 50, the inner end of each bore 29 is radially aligned with the end faces 65 (seen in FIG. 5b) of each of the clamp member segments 60a, 60b, 60c. Thus, a bolt or tensioner passed through the bores 29 contacts the end faces 65 of the clamp member segments, and then urges the clamp member segments axially away from the shoulder 28, causing axial movement of the clamp member 50 relative to the body 10 that is equivalent to the axial movement of the clamp member relative to the body that will be caused by axial load on the flowline 3, as described in greater detail below.

In operation, the riser clamp assembly 1 acts to initially restrict, and then substantially prevent, axial movement of the flowline 3 through the riser clamp assembly toward the FPSO, or away from the PLET. The body 10 of the riser clamp assembly 1 surrounds the clamp member segments 60a, 60b, 60c and maintains contact between the inner surfaces 63 of the clamp member segments and the outer surface of the flowline 3, as seen in FIG. 3f. As described above, in this example the inner surfaces of the clamp member segments comprise a high friction material or layer. The high friction material ensures that in the event of an axial load on the flowline 3, for example axial tension caused by the FPSO moving away from the riser clamp assembly 1, any movement of the flowline 3 relative to the clamp member segments 60a, 60b, 60c is substantially prevented. In other words, the flowline 3 should not slip through the clamp member 50.

Thus, any axial movement of the flowline 3 through the riser clamp assembly 1 causes axial movement of the clamp member 50 relative to the body 10. The clamp member 50 is prevented from axial movement relative to the body 10 toward the PLET, due to the shoulders 28 of each body segment 20a, 20b, 20c which act as stops against the end faces 64 of each clamp member segment 60a, 60b, 60c. Additionally, the axis-perpendicular faces 73a of each tooth 72 on the outer surfaces 62 of the clamp member segments 60a, 60b, 60c abut the axis-perpendicular faces 33a of each tooth 32 on the inner surfaces 23 of the body segments 20a, 20b, 20c, also preventing relative movement of the clamp member 50 relative to the body 10 toward the PLET.

As can be best seen in FIG. 3g, axial movement of the clamp member 50 relative to the body 10 toward the FPSO causes the end faces 64 of each clamp member segment 60a, 60b, 60c to separate from the shoulders 28 of each body segment 20a, 20b, 20c. Also, the tapered faces 73b of each tooth 72 on the outer surfaces 62 of the clamp member segments 60a, 60b, 60c begin to slide axially over the tapered faces 33b of each tooth 32 on the inner surfaces 23 of the body segments 20a, 20b, 20c. As the tapered faces 73b, 33b of corresponding teeth 72, 32 slide axially relative to each other, the clamp member segments 60a, 60b, 60 are also urged in a radially inward direction. In other words, as the maximum outer diameter of each annular tapered portion 70 of the outer surface 62 of the clamp member 50 approaches the minimum inner diameter of each annular tapered portion 30 of the inner surface 23 of the body 10, the clamp member 50 is displaced in a radially inward direction away from the inner surface 23 of the body 10. In FIG. 3g, the extent of compression of the outer surface of the flowline 3 is exaggerated for the purposes of the Figure.

As the clamp member segments 60a, 60b, 60c move radially inward, the circumferential gaps between the clamp member segments also reduce. In this example, the initial circumferential gaps between the clamp member segments 60a, 60b, 60c (best seen in FIG. 3d) are sized to ensure that they do not close completely, even at the maximum extent of inward radial movement of the clamp member segments. In other words, in this example, continued inward radial movement of the clamp member segments is not restricted or prevented by the circumferential edge faces 66a, 66b of each clamp member segment contacting adjacent clamp member segments. Instead, inward radial movement of the clamp member segments relative to the body 10 is limited only by the maximum deflection of the outer surface of the flowline 3 under radial compression.

As further inward radial movement of the clamp member segments 60a, 60b, 60c (caused by further axial movement of the flowline 3 relative to riser clamp assembly) begins to be opposed by reaction of the flowline 3 to the radial compression of the flowline 3, the pressure between the tapered faces 73b, 33b of the teeth 72, 32 on the outer and inner surfaces of the clamp member 50 and body 10 respectively begins to increase. The increasing pressure between the tapered faces 73b, 33b of corresponding teeth 72, 32 generates an axial force between the clamp member 50 and the body 10 that opposes the axial motion of the clamp member 50 relative to the body 10. When the opposing axial force generated between the teeth 72, 32 of the clamp member 50 and body 10 balances the axial force of the flowline 3 tension through the riser clamp assembly 1, further axial movement of the flowline 3 through the riser clamp assembly is prevented.

If the axial tension in the flowline 3 increases even further, for example in response to the FPSO moving even further away from the riser clamp assembly 1, the clamp member 50 may move further axially relative to the body 10. This causes further inward radial movement of the clamp member segments 60a, 60b, 60c, and increased radial compression of the flowline 3. The increased reaction of the flowline 3 to the increased inward radial force on the flowline further increases the pressure between the tapered faces 73b, 33b of corresponding teeth 72, 32, in turn increasing the opposing axial force generated between the teeth 72, 32. When the increased opposing axial force again balances the axial force acting on the flowline 3, further axial movement of the flowline 3 relative to the riser clamp assembly 1 is again arrested.

In this example, the radial dimensions of the axis-perpendicular faces 73a, 33a of the teeth 72, 32 are sized to ensure that even under maximum design axial load on the flowline 3, and with maximum radial deflection of the outer surface of the flowline 3 (including any change in the outer diameter of the flowline 3 over time, for example due to effects of creep and/or age on the material of the outer surface of the flowline, or due to the temperature of fluids passing through the flowline), the peaks of corresponding teeth 72, 32 cannot pass each other in an axial direction. In other words, the axis-perpendicular faces 73a, 33a of the teeth 72, 32 are sufficiently large (e.g. sufficiently deep in a radial direction) to ensure that teeth 72, 32 cannot 'skip' past each other. Typically, in this example, the greatest axial separation between the axis-perpendicular faces 73a, 33a of corresponding teeth 72, 32 of the clamp member and body segments, when the flowline 3 and clamp member 50 are under maximum design axial load relative to the body 10, is from 5% to 15% of the axial dimension of each tooth 72, 32. In other examples, the greatest separation between the axis-perpendicular faces 73a, 33a of corresponding teeth 72, 32 may be greater than or less than this, for example less than 5%, or 50% or more.

Conversely, if the axial tension in the flowline 3 decreases, the opposing axial force between corresponding teeth 72, 32 of the clamp member 50 and body 10 (due to the reaction of the flowline 3 to the radial compression applied by the clamp member segments 60a, 60b, 60c in their current radial position) may be greater than the reduced axial force on the flowline 3. This causes the clamp member segments 60a, 60b, 60c to move axially in the opposite direction toward their initial positions, and also in a radially outward direction, until the axial forces acting on the flowline 3 are balanced.

A second example of a subsea line clamp assembly 101 in accordance with the present invention is shown in FIG. 6a. The second example is generally similar to the first example described above, and equivalent parts are numbered similarly, but the reference numbers are increased by 100. In the second example, the riser clamp assembly comprises a body 110 and a clamp member 150 arranged inside the body 110. The body 110 is generally cylindrical in the same manner as the body 10 of the first example.

Figure 6D:
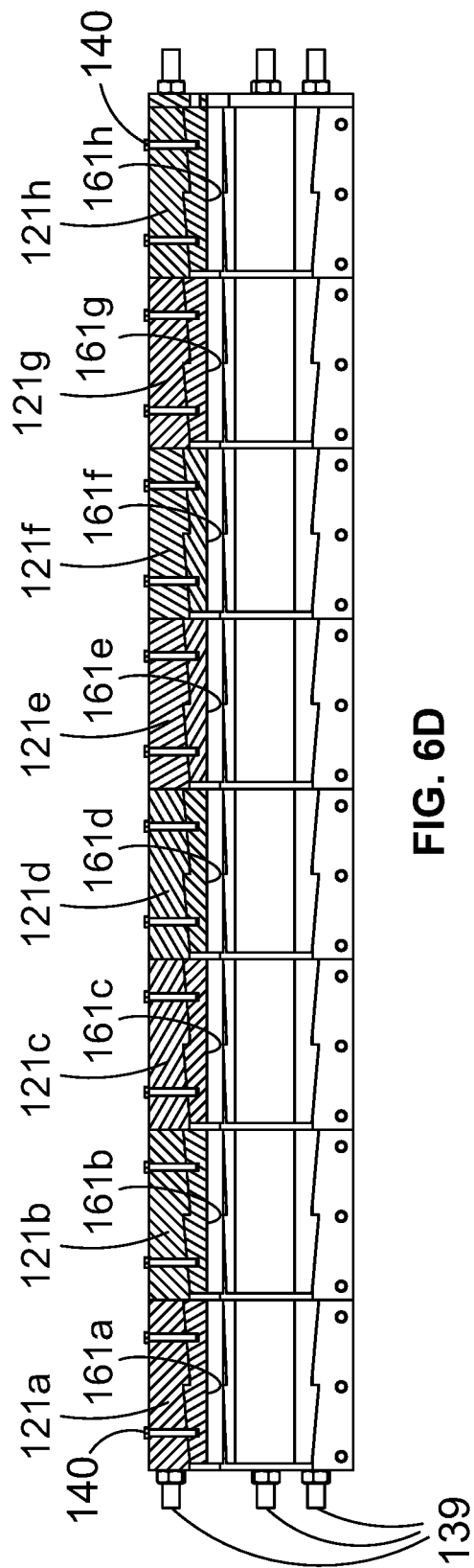
Figure 6F:
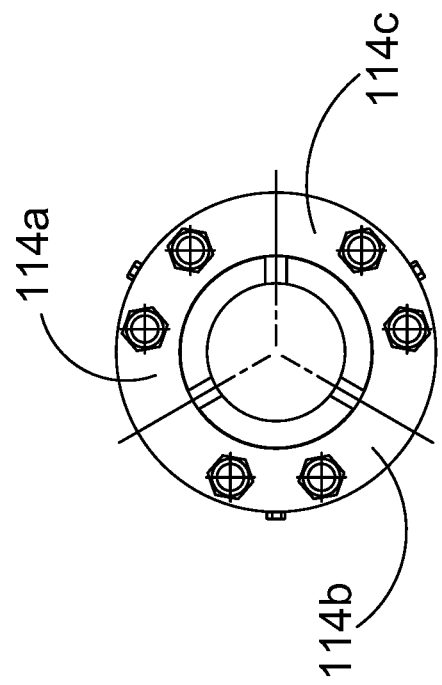
Figure 6E:
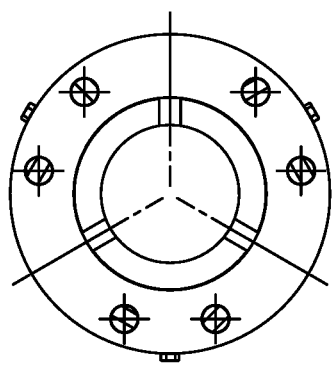
Figure 7B:
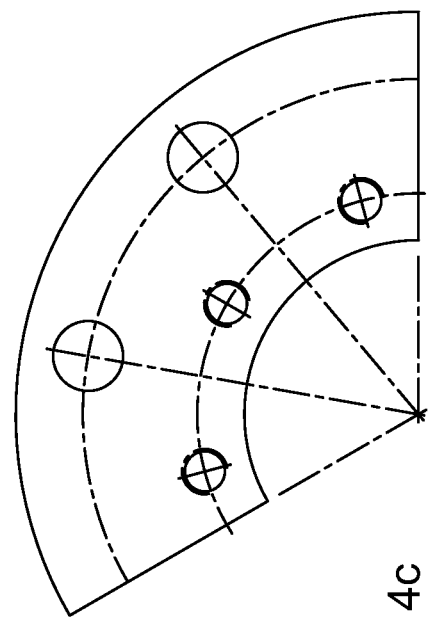
FIGS. 7a and 7b show isometric and plan views of an end plate for attachment to the axial ends of the FIG. 6 subsea line clamp assembly.
Figure 7A:
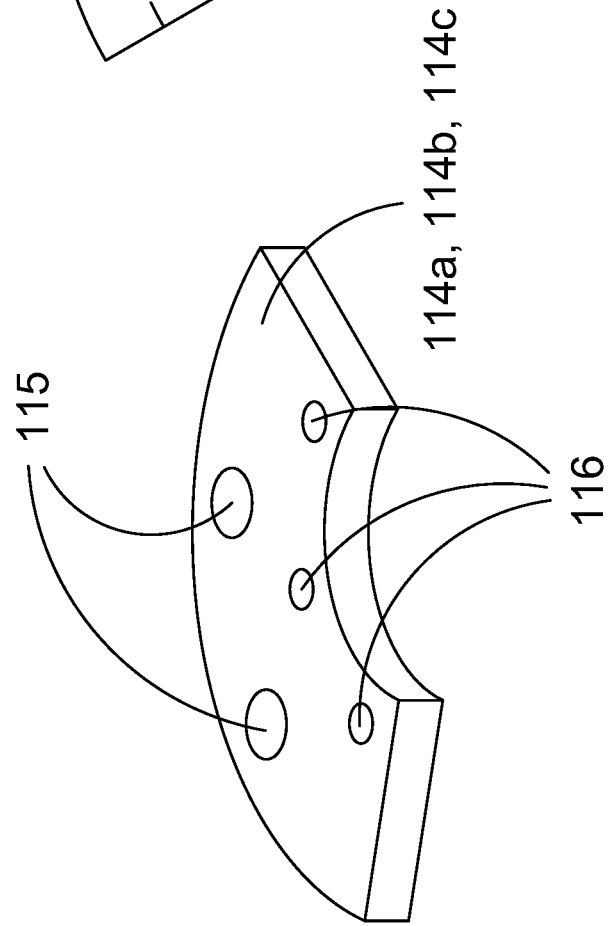

As best seen in FIGS. 6b and 6e, and shown in FIGS. 7a and 7b, end plates 114a, 114b, 114c are disposed at opposite axial ends of the body 110, when the body is fully assembled, as will described in greater detail below. In this example each end plate 114a, 114b, 114c comprises two larger circular axial apertures 115 and three smaller circular axial apertures 116, but the exact number of apertures 115, 116 is not limiting.

Figure 8C:
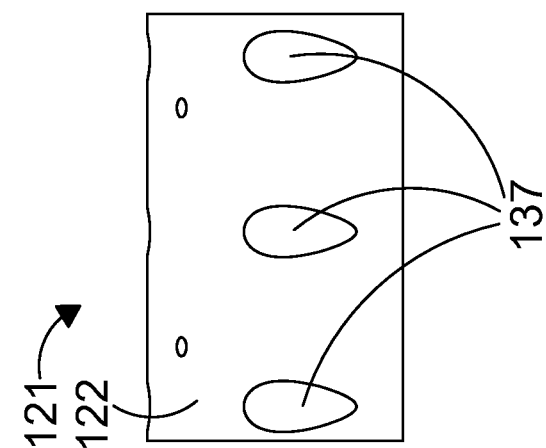
FIGS. 8a-8d show different views of the body sections of the FIG. 6 subsea line clamp assembly.
Figure 8B:
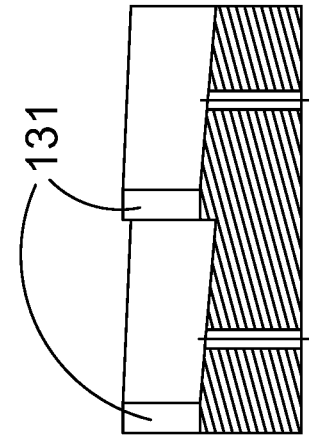
Figure 8B:
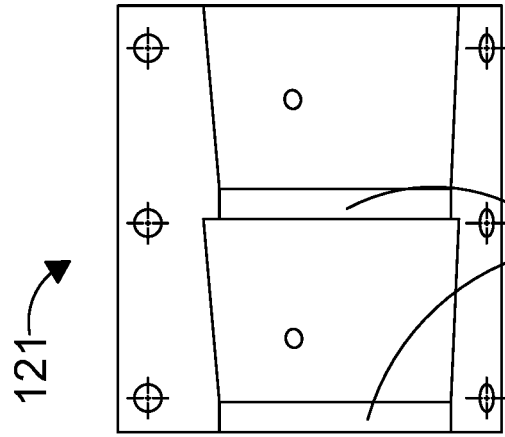
Figure 8D:
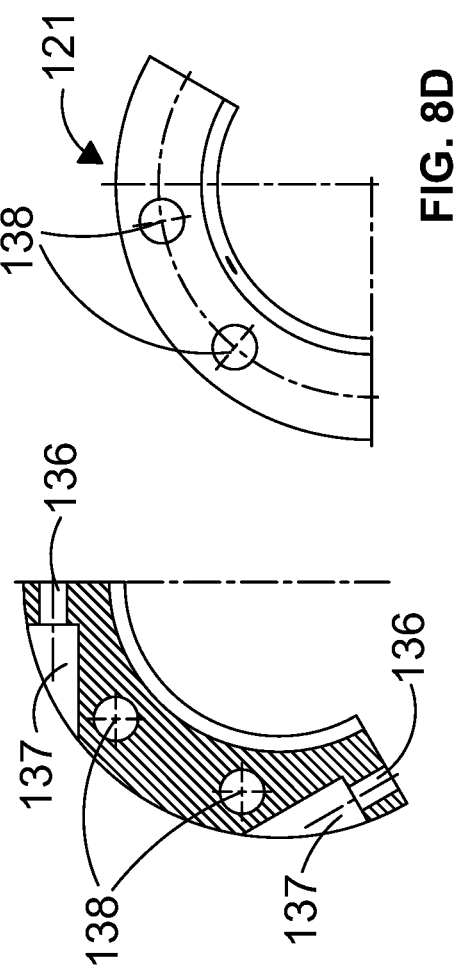
Figure 8A:
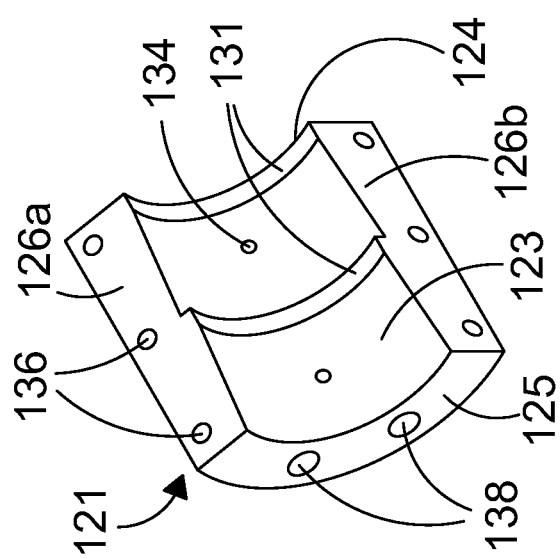

In the second example, the longitudinal segments 120a, 120b, 120c of the body 110 are modular, and each longitudinal segment e.g. 120a is further divided into eight axial sections 121a-121h, as best seen in FIG. 6d, and in detail in FIGS. 8a and 8b. In this example each of the axial sections 121a-121h have approximately equal axial lengths, and comprise two tapered portions 130, but in other examples the axial sections may have varying axial lengths, and there may be fewer than or more than eight axial sections. Each axial section may also comprise more or fewer than two tapered portions 130. In this example, each axial section 121 of the body 110 also has an axis-parallel portion 131 adjacent to the end face 124 (i.e. nearest to the FPSO) of each tapered portion 130, as best seen in FIG. 8a.

The body 110 optionally incorporates at least one section 121 that incorporates first padeyes 118 (shown in FIGS. 6a and 6b) that are optionally adapted for connection to one or more buoyancy modules, for reasons explained previously in relation to the first example of a subsea line clamp assembly. The body 110 also generally incorporates at least one (optionally different) section 121 that incorporates second padeyes 119a, 119b (also shown in FIGS. 6a and 6b), or other anchor attachment point, which are adapted to tether the body with chains or cables to a subsea anchor or suction pile, again as explained previously for the first example.

In the second example 101, the longitudinal segments 160a, 160b, 160c of the clamp member 150 are also modular, and are similarly divided into axial sections, as shown in FIGS. 9a and 9b. Thus, for example, clamp member segment 160a is divided into eight axial sections 161a-161h as shown in FIG. 6d. In this example each clamp member axial section 161a-161h is identical, and corresponds with a respective body axial section 121a-121h. In this example, each axial section 161 of the clamp member 150 also has an axis-parallel portion 171 between the tapered portions 170.

Also in this example, the axial length of each axial section 161 of the clamp member 150 is typically shorter than the corresponding axial section 121 of the body 120. In other words, when the subsea line clamp assembly 101 is fully assembled, the end faces 124, 125 of each axial section 121 of the body 120 contact (and are clamped against) corresponding end faces 124, 125 of adjacent axial sections. In contrast, in this example, the end faces 164, 165 of each axial section 161 of the clamp member 150 are axially spaced from the end faces 164, 165 of adjacent axial sections. This axial spacing is in addition to the circumferential spacing that also exists between the circumferential edge faces 166a, 166b of the axial sections 161 of adjacent longitudinal segments 160a, 160b, 160c, as described previously in the first example. The axial spacing between adjacent axial section 161 of the clamp member 150 provides a tolerance in the exact axial dimensions of each axial section, to allow for any manufacturing inaccuracies and/or deviations from exact design dimensions, and to ensure that such manufacturing inaccuracies do not restrict or inhibit the free axial movement of each axial section 161 in response to axial movement of the flowline 103 relative to the subsea line clamp assembly 101.

The second example of a subsea line clamp assembly 101 may be assembled around a flowline 103 in a similar manner to the subsea line clamp assembly 1 of the first example described previously. Typically, the axial sections 121a-121h of each body segment 120a, 120b, 120c are first assembled by aligning apertures 138 which extend axially through the wall of each axial section between axial edge faces 124, 125 of each axial section. In the second example, it is possible to select as many axial sections 121a-121h as are required to make up the total required length of the subsea line clamp assembly 101. For example, in applications where the maximum axial load that will be applied by flowline 103 is known to be less than a certain threshold, the total length of the subsea line clamp assembly 101 can be shorter (and thus made up of fewer axial sections 121a-121h) than another subsea line clamp assembly adapted for greater axial loads, which can comprise a larger number of axial sections 121. When all axial sections 121a-121h are positioned relative to each other to form, for example, longitudinal segment 120a, end plates 114a are placed at either axial end of longitudinal segment 120a, and axial fixing studs or bolts 139 are passed through apertures 115 of end plate 114a and though each of the aligned apertures 138 of the axial sections, and then tightened or otherwise secured in order to clamp the axial edge faces 124, 125 of adjacent axial sections to each other. In this example, the axial fixing bolts 139 are approximately equal to, or slightly longer than, the entire axial length of the body segments 120a, 120b, 120c, and so each fixing bolt extends between the end faces of the body 110.

After the longitudinal segments 120a, 120b, 120c of the body 110 have been assembled, the corresponding segments 160a, 106b, 160c of the clamp member 150 are secured to the respective segments 120a, 120b, 120c of the body 110 by installation bolts 140, in a generally similar manner to the first example. In this example, each axial section 161a-161h of e.g. clamp member segment 160a is aligned with body segment 120a, so that recesses 174 of each axial section 161a, 161b, 161c (best seen in FIGS. 9b and 9c) are aligned with respective apertures 134 (best seen in FIG. 8a) of e.g. body segment 160a. Therefore, instead of five installation bolts 40 used to secure, for example, body and clamp member segments 20a, 60a in the first example, in this example each installation bolt 140 can be used to secure a single axial section 161a-161h. In other examples, each axial section may be secured with more than one installation bolt 140.

The body segments 120a, 120b, 120c are then assembled to form the complete subsea line clamp assembly 101, in a similar manner to the first example. In this example, as shown in FIGS. 8a-8c, apertures 126 are disposed along the circumferential edge faces 126a, 126b of each axial section 121 of the body segments 120a, 120b, 120c. Each aperture 126 is joined to a corresponding recess 137 on the outer surface of each body segment 120a, 120b, 120c. The body segments 120a, 120b, 120c are assembled by aligning the apertures 136 of each body segment 120a, 120b, 120c with the apertures 136 of adjacent body segments, and then passing fixing bolts or other fasteners (not shown in the Figures) through the aligned apertures 136 of adjacent body segments to clamp the circumferential edge faces 126a, 126b of adjacent body segments to each other.

Alternatively, the subsea line clamp assembly 101 may be assembled by first securing axial sections 161 of the clamp member 150 to corresponding axial sections 121 of the body 110, and then joining circumferential edge faces 126a, 126b of axial sections 121 to form cylindrical portions of the body 110, before then joining all such cylindrical portions of the body and end plates 114a, 114b, 114c with axial fixing bolts 139.

In operation, the second example of a subsea line clamp assembly 101 functions in a similar manner to the first example described previously. Although the body segments 120a, 120b, 120c of the second example comprise individual axial sections, once the body 110 is fully assembled with both axial and radial fixing bolts or other fasteners, it is structurally and functionally equivalent to the body 10 of the first example. In contrast, each of the clamp member segments 160a, 160b, 160c of the second example is separated into individual axial sections 161a-161h, and after removal of the temporary installation bolts 140, each axial section of each longitudinal segment of the clamp member 50 is axially spaced from other adjacent axial sections, and is free to adjust its position and orientation independently of all other axial sections. This provides advantages over the unitary clamp member segments 60a, 60b, 60c of the first example.

Firstly, since the clamp member segments 160a, 160b, 160c are not continuous, the outer surface of the flowline 103 is typically not uniformly compressed by the clamp member 150 of the second example. The portions of the flowline 103 in contact with axial sections 161a-161h are typically compressed to a greater extent than the portions of the flowline not in contact with the axial sections of clamp member segment 160a, 160b, 106c. In other words, the outer diameter of the flowline 103 can be reduced more in areas of the outer surface of the flowline in contact with axial sections 161a-161h than in areas aligned with the axial gaps between sections 161a-161h. Thus, each axial section 161a-161h can be slightly embedded into the outer surface of the flowline 103 compared to the outer surface of the flowline between each axial section 161a-161h. This can advantageously prevent or further reduce the risk of axial 'slip' between the clamp member 150 and the flowline 103 when the flowline is under axial load.

Secondly, each axial section 161a-161h can adjust its circumferential position and orientation (e.g. pitch and yaw) independently of adjacent axial sections. This optionally allows the clamp member 150 to compensate for any localised irregularities in the outer diameter and/or rigidity of the outer surface of the flowline 103, which compared to the clamp member segments 60a, 60b, 60c of the first example, reduces the possibility of the clamp member 150 sticking or seizing against the body 110, and also reduces the possibility of excessive, localised radial compression of the outer surface of the flowline 103.

What is claimed is:

1. A subsea line clamp assembly, comprising a body having an axis and a clamp member, the body comprising at least first and second body segments adapted to be assembled around a subsea line, the body having an anchor attachment point adapted to tether the body to a subsea anchor, the clamp member comprising at least first and second clamp member segments, the clamp member being movable relative to the body and having an outer surface adapted to engage an inner surface of the body, and an inner surface adapted to engage the subsea line within the subsea line clamp assembly, the inner surface of the body having at least one first tapered portion, and the outer surface of the clamp member having at least one second tapered portion arranged to engage the first tapered portion on the inner surface of the body, wherein the clamp member and the body are divided in a direction along the axis into the same number of segments, with each body segment having a respective clamp member segment, and wherein each body segment has a larger angular dimension than its respective clamp member segment, and wherein a first friction value between the inner surface of the body and the outer surface of the clamp member is lower than a second friction value between the inner surface of the clamp member and the outer surface of the subsea line.

2. A subsea line clamp assembly as claimed in claim 1, wherein the clamp member is radially and axially movable relative to the body, and wherein axial movement of the clamp member in a first direction relative to the body when the first and second tapered portions are engaged urges the inner surface of the clamp member radially inwards with respect to the body against the outer surface of the subsea line.

3. A subsea line clamp assembly as claimed in claim 1, wherein the clamp member and the body are divided circumferentially into axial sections, with each axial body section having a respective axial clamp member section, and wherein each axial body section has a larger axial dimension than its respective axial clamp member section.

4. A subsea line clamp assembly as claimed in claim 1, wherein the clamp member is axially movable relative to the body in a first direction, and wherein the assembly incorporates a stop member between the outer surface of the clamp member and the inner surface of the body restricting axial movement of the clamp member relative to the body in a second direction opposite to the first direction.

5. A subsea line clamp assembly as claimed in claim 1, wherein the inner surface of the body has an array of first tapered portions, wherein the first tapered portions are annular, extending around at least a portion of the inner surface of the body, and wherein the outer surface of the clamp member has an array of second tapered portions, wherein the second tapered portions are annular, extending around at least a portion of the outer surface of the clamp member.

6. A subsea line clamp assembly as claimed in claim 1, wherein the first and second tapered portions are tapered at the same angle relative to an axis of the body.

7. A subsea line clamp assembly as claimed in claim 1, incorporating at least one axis parallel portion between repeating first and second tapered portions of the body and clamp member.

8. A subsea line clamp assembly as claimed in claim 7, wherein the axis parallel portion is disposed on a radial minimum.

9. A subsea line clamp assembly as claimed in claim 1, wherein the inner surface of the body and the outer surface of the clamp member each incorporate axis parallel portions, wherein respective axis-parallel portions on the body and clamp member overlap axially in the subsea line clamp assembly.

10. A subsea line clamp assembly as claimed in claim 9, wherein the axially overlapping axis-parallel portions on the body and the clamp member are radially spaced from one another by a radial clearance.

11. A method of clamping a subsea line, comprising assembling a subsea line clamp assembly onto an outer surface of the subsea line, the subsea line clamp assembly comprising:
- a body having an axis and being divided into at least first and second body segments adapted to be assembled around the subsea line, the body having an anchor attachment point adapted to tether the body to a subsea anchor,
- a clamp member comprising at least first and second clamp member segments, the clamp member having an outer surface adapted to engage an inner surface of the body extending circumferentially around the outer surface of the clamp member, and an inner surface adapted to engage the subsea line with the subsea line clamp assembly,
- wherein the clamp member and the body are divided in a direction along the axis into the same number of segments, with each body segment having a respective clamp member segment,
- wherein at least one segment of the clamp member is radially and axially movable relative to the body when the assembly is assembled around the subsea line,
- the inner surface of the body having a plurality of first tapered portions and the outer surface of the clamp member having a plurality of second tapered portions arranged to engage the first tapered portions on the inner surface of the body during movement of the clamp member relative to the body, wherein the first and second tapered portions face opposite ends of the subsea line clamp assembly, and wherein friction between the inner surface of the body and outer surface of the clamp member is lower than the friction between the inner surface of the clamp member and the outer surface of the subsea line;
- and wherein axial movement of the clamp member in a first direction relative to the body when the first and second tapered portions are engaged urges the inner surface of the clamp member radially inwards with respect to the body against the outer surface of the subsea line;
- wherein each body segment has a larger angular dimension than its respective clamp member segment.

12. A method as claimed in claim 11, wherein the subsea line is a marine riser conduit.

13. A method as claimed in claim 11, wherein the clamp member slides in the first direction relative to the body to maintain consistency of the clamping force on the subsea line in the event of reduction in the outer diameter of the subsea line after assembling the subsea line clamp assembly onto the outer surface of the subsea line.

14. A method as claimed in claim 11, wherein the clamp member is axially movable relative to the body in a first direction, wherein the method includes restricting axial movement of the clamp member in a second direction opposite to the first direction by a stop member formed by the outer surface of the clamp member and the inner surface of the body.

15. A subsea line clamp assembly, comprising a body having an axis and a clamp member, the body comprising at least first and second body segments adapted to be assembled around a subsea line, the body having an anchor attachment point adapted to tether the body to a subsea anchor, the clamp member comprising at least first and second clamp member segments, the clamp member being movable relative to the body and having an outer surface adapted to engage an inner surface of the body, and an inner surface adapted to engage the subsea line within the subsea line clamp assembly, the inner surface of the body having a plurality of first tapered portions, the first tapered portions being annular and extending around at least a portion of the inner surface of the body, and the outer surface of the clamp member having a plurality of second tapered portions, wherein the second tapered portions are annular, extending around at least a portion of the outer surface of the clamp member and wherein the second tapered portions are arranged to engage the first tapered portions on the inner surface of the body during movement of the clamp member relative to the body, wherein the clamp member and the body are divided in a direction along the axis into the same number of segments, with each body segment having a respective clamp member segment, and wherein each body segment has a larger angular dimension than its respective clamp member segment, wherein the clamp member and the body are divided circumferentially into axial sections, with each axial body section having a respective axial clamp member section, and wherein each axial body section has a larger axial dimension than its respective axial clamp member section.

16. A subsea line clamp assembly as claimed in claim 15, incorporating at least one axis parallel portion between repeating first and second tapered portions of the body and clamp member.

17. A subsea line clamp assembly as claimed in claim 16, wherein the axis parallel portion is disposed on a radial minimum.

18. A subsea line clamp assembly as claimed in claim 16, wherein the axis-parallel portions of the inner surface of the body are adjacent to a minimum inner diameter of each first tapered portion, and wherein the axis-parallel portions of the outer surface of the clamp member are adjacent to a minimum outer diameter of each second tapered portion.

19. A subsea line clamp assembly as claimed in claim 15, wherein the inner surface of the body and the outer surface of the clamp member each incorporate axis parallel portions, wherein respective axis-parallel portions on the body and clamp member overlap axially in the subsea line clamp assembly.

20. A subsea line clamp assembly as claimed in claim 19, wherein the axially overlapping axis-parallel portions on the body and the clamp member are radially spaced from one another by a radial clearance.

* * * * *